United States Patent
Mizuguchi et al.

(10) Patent No.: US 11,855,566 B2
(45) Date of Patent: Dec. 26, 2023

(54) ELECTRIC MOTOR CONTROL APPARATUS AND ELECTRIC MOTOR CONTROL METHOD

(71) Applicant: NISSAN MOTOR CO., LTD., Yokohama (JP)

(72) Inventors: Takahiro Mizuguchi, Kanagawa (JP); Mitsuhiro Shouji, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 21 days.

(21) Appl. No.: 17/629,096

(22) PCT Filed: Aug. 28, 2020

(86) PCT No.: PCT/JP2020/032780
§ 371 (c)(1),
(2) Date: Jan. 21, 2022

(87) PCT Pub. No.: WO2022/044299
PCT Pub. Date: Mar. 3, 2022

(65) Prior Publication Data
US 2022/0368264 A1 Nov. 17, 2022

(51) Int. Cl.
*H02P 21/00* (2016.01)
*H02P 27/08* (2006.01)
*H02P 21/22* (2016.01)

(52) U.S. Cl.
CPC ............ *H02P 27/085* (2013.01); *H02P 21/22* (2016.02)

(58) Field of Classification Search
CPC ........... H02P 27/085; H02P 21/22; H02P 6/10
See application file for complete search history.

(56) References Cited

FOREIGN PATENT DOCUMENTS

| EP | 0 732 798 B1 | 9/1996 |
|---|---|---|
| JP | 3276135 B2 | 4/2002 |
| JP | 2005-086920 A | 3/2005 |
| JP | 2010-051129 A | 3/2010 |
| JP | 2011-234452 A | 11/2011 |
| JP | 2019187097 A | * 10/2019 |
| WO | WO-2017/077599 A1 | 5/2017 |

* cited by examiner

*Primary Examiner* — Karen Masih
(74) *Attorney, Agent, or Firm* — Foley & Lardner LLP

(57) ABSTRACT

An electric motor control apparatus that alternately switches modulation mode between an asynchronous PWM control, which controls an electric motor by fixing a PWM frequency, and a synchronous PWM control, which controls the electric motor by making the PWM frequency proportional to a drive frequency of the electric motor, wherein when switching the modulation mode, a compensation value is calculated based on a state quantity, which correlates with a component in a rotating coordinate system of a voltage applied to the electric motor and is obtained immediately before switching, and the voltage immediately after switching is compensated for by the compensation value.

6 Claims, 21 Drawing Sheets

ELECTRIC MOTOR CONTROL APPARATUS AND ELECTRIC MOTOR CONTROL METHOD

TECHNICAL FIELD

The present invention relates to an electric motor control apparatus and an electric motor control method.

BACKGROUND ART

JP3276135B discloses an electric motor control apparatus that switches modulation mode between an asynchronous PWM control, which controls the electric motor by fixing a PWM frequency, and a synchronous PWM control, which controls the electric motor by making the PWM frequency proportional to a drive frequency of the electric motor. The switching control of the modulation mode is executed every time the operating state of the motor becomes a predetermined condition.

SUMMARY OF INVENTION

However, since JP3276135B has a configuration in which the voltage applied to the electric motor is independently switched for each phase during the switching control, in each phase, a control section in which the modulation mode is inconsistent may occur, causing a 3-phase imbalance, thereby may cause voltage disturbance and fluctuations in motor torque.

Thus, the object of the present invention is to provide an electric motor control apparatus and an electric motor control method for suppressing motor torque fluctuations by suppressing voltage disturbance when switching the modulation mode between asynchronous PWM control and synchronous PWM control.

An electric motor control apparatus according to one embodiment of the present invention is an electric motor control apparatus that alternately switches modulation mode between an asynchronous PWM control, which controls an electric motor by fixing a PWM frequency, and a synchronous PWM control, which controls the electric motor by making the PWM frequency proportional to a drive frequency of the electric motor, wherein when switching the modulation mode, a compensation value is calculated based on a state quantity, which correlates with a component in a rotating coordinate system of a voltage applied to the electric motor and is obtained immediately before switching, and the voltage immediately after switching is compensated for by the compensation value.

DESCRIPTION OF EMBODIMENTS

Hereinafter, embodiments of the present invention will be described with reference to the drawings.

First Embodiment

Figure 1:
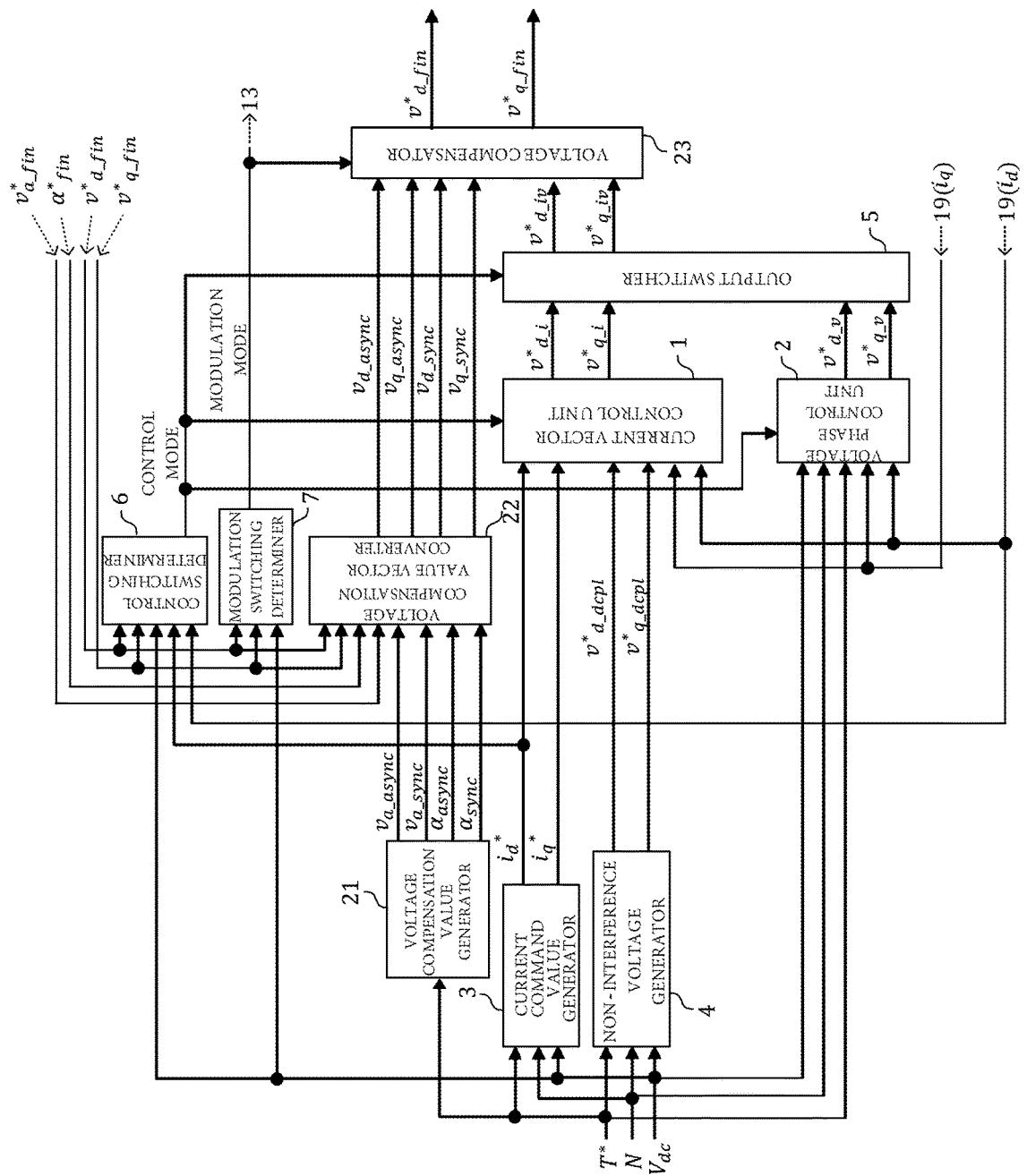
FIG. 1 is a diagram showing a main configuration (torque command value input side) of an electric vehicle to which an electric motor control apparatus of a first embodiment is applied.
Figure 2:
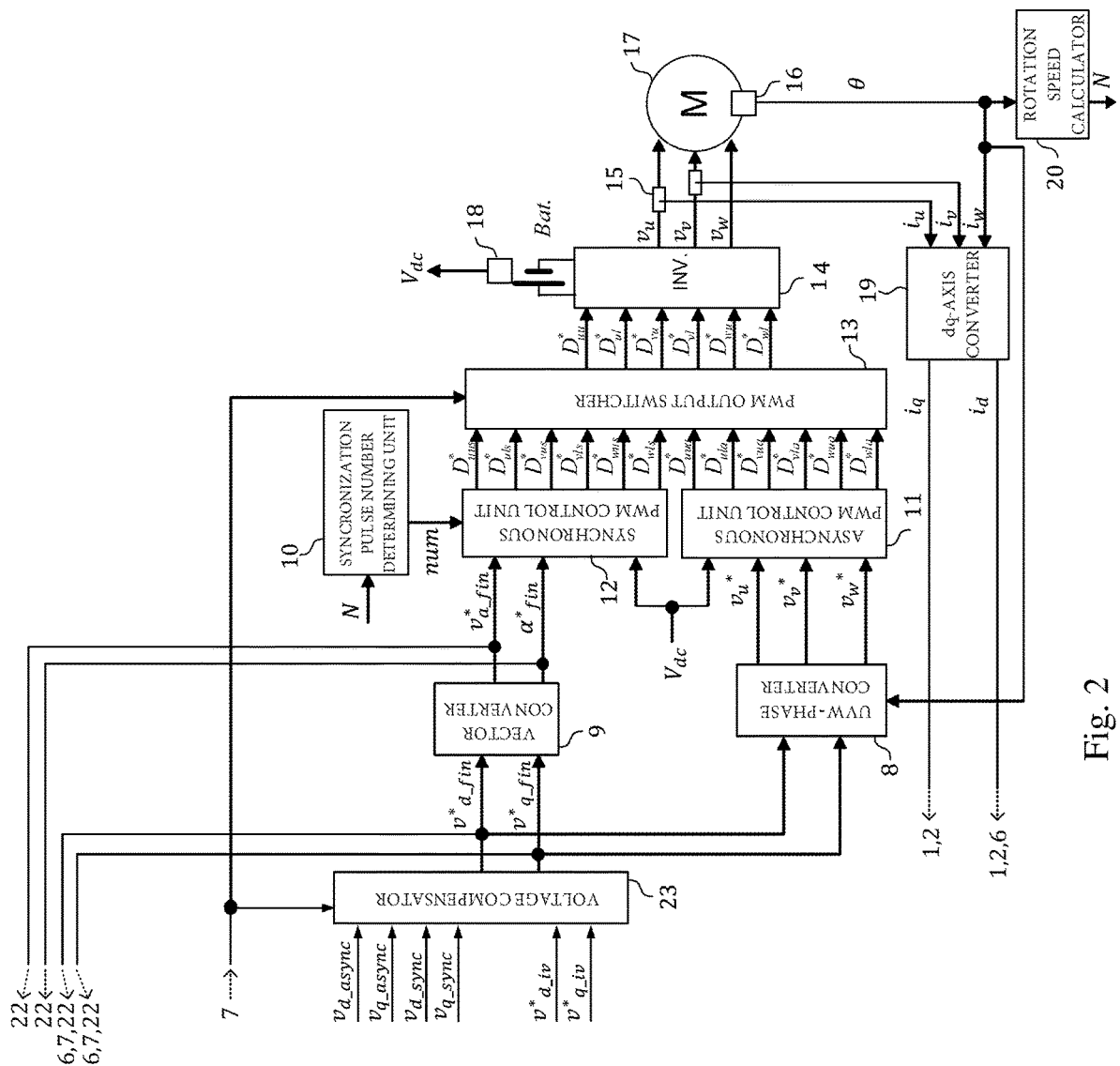
FIG. 2 is a diagram showing a main configuration (motor side) of the electric vehicle to which the electric motor control apparatus of the first embodiment is applied.

FIG. 1 is a diagram showing a main configuration (torque command value input side) of an electric vehicle to which an electric motor control apparatus of a first embodiment is applied. FIG. 2 is a diagram showing a main configuration (motor side) of the electric vehicle to which the electric motor control apparatus of the first embodiment is applied.

The electric motor control apparatus according to the present invention is applicable to an electric vehicle including an electric motor (motor 17) that functions as a part or all of the drive source of the vehicle. The electric vehicle includes not only electric automobile, but also hybrid automobile and fuel-cell automobile.

The current vector control unit 1 executes a current control (current vector control) that controls the drive of the motor 17 by controlling the current applied to the motor 17. Specifically, the current vector control unit 1 calculates the dq-axis voltage command value ($v^*_{d\_i}$, $v^*_{q\_i}$) for generating (outputting) the desired torque in the motor 17 based on the torque command value T*, current command value ($i^*_d$, $i^*_q$), non-interference voltage ($v^*_{d\_dcpl}$, $v^*_{q\_dcpl}$), and dq-axis current detection value ($i_d$, $i_q$), and outputs the value to the output switcher 5. The torque command value T* is a value determined according to the depression amount (accelerator opening), etc. of the accelerator. The details of the current vector control unit 1 will be described later with reference to FIG. 7.

The voltage phase control unit 2 executes a voltage phase control that controls the drive of the motor 17 by controlling the voltage phase of the voltage applied to the motor 17. Specifically, the voltage phase control unit 2 calculates the dq-axis voltage command value ($v^*_{d\_v}$, $v^*_{q\_v}$) for generating the desired torque in the motor 17 based on the torque command value T*, rotation speed N of the motor 17, voltage detection value $V_{dc}$ of the battery (Bat.), and dq-axis current detection value $i_d$, $i_g$, and outputs the value to the output switcher 5. The details of the voltage phase control unit 2 will be described with reference to FIG. 8 and FIG. 9.

The current command value generator 3 generates and outputs the current command value ($i^*_d$, $i^*_q$) based on the torque command value T*, rotation speed N, and voltage detection value $V_{dc}$. The current command value generator 3 stores a dedicated table that makes the torque command value T* correspond to the d-axis current command value $i^*_d$ and q-axis current command value $i^*_q$, and when the torque command value T* is input, the current command value ($i^*_d$, $i^*_q$) is output via this table.

The non-interference voltage generator 4 generates and outputs the non-interference voltage ($v^*_{d\_dcpl}$, $v^*_{q\_dcpl}$) using the dedicated table as described above based on the torque command value T*, rotation speed N, and voltage detection value $V_{dc}$.

The control switching determiner 6 determines whether to execute a current vector control or voltage phase control as the method (control mode) for controlling the motor 17. Specifically, the control switching determiner 6 selects to execute either a current vector control or a voltage phase control based on the d-axis current command value id*, d-axis current detection value $i_d$, dq-axis final voltage command value ($v^*_{d\_fin}$, $v^*_{q\_fin}$), and voltage detection value $V_{dc}$ of the battery (Bat.), and outputs the control mode signal corresponding to the selected control mode to the output switcher 5. Further, the details of the control switching determiner 6 will be described later with reference to FIG. 11 and FIG. 12.

The modulation switching determiner 7 determines to execute either an asynchronous PWM control or a synchronous PWM control based on the dq-axis final voltage command value ($v^*_{d\_fin}$, $v^*_{q\_fin}$) and voltage detection value $V_{dc}$, and outputs the signal of the selected modulation mode (synchronous, asynchronous) (for example, asynchronous is "0" ("1" in FIG. 6), synchronous is "1" ("2" in FIG. 6)). Further, the details of the modulation switching determiner 7 will be described later with reference to FIG. 13 and FIG. 14.

The voltage compensation value generator 21 generates a voltage compensation value ($v_{a\_async}$, $v_{a\_sync}$, $\alpha_{async}$, $\alpha_{sync}$) based on the torque command value T* and outputs the value to the voltage compensation value vector converter 22. The details of the voltage compensation value generator 21 will be described later with reference to FIG. 3.

The voltage compensation value vector converter 22 outputs the dq-axis voltage compensation value ($v_{d\_async}$, $v_{q\_async}$) for transferring to asynchronous PWM control based on the voltage compensation value ($v_{a\_async}$, $\alpha_{async}$) output from the voltage compensation value generator 21, dq-axis final voltage command value ($v^*_{d\_fin}$, $v^*_{q\_fin}$) output from the voltage compensator 23, final voltage norm $V^*_{a\_fin}$ output from the vector converter 9, and final voltage phase $\alpha^*_{fin}$. Further, the voltage compensation value vector converter 22 outputs the dq-axis voltage compensation value ($v_{d\_sync}$, $v_{q\_sync}$) for transferring to synchronous PWM control based on the voltage compensation value ($v_{a\_sync}$, $\alpha_{sync}$) output from the voltage compensation value generator 21, dq-axis final voltage command value ($v^*_{d\_fin}$, $v^*_{q\_fin}$) output from the voltage compensator 23, final voltage norm $V^*_{a\_fin}$ output from the vector converter 9, and final voltage phase $\alpha^*_{fin}$. The details of the voltage compensation value vector converter 22 will be described later with reference to FIG. 4.

The voltage compensator 23 generates the dq-axis final voltage command value ($v^*_{d\_fin}$, $V^*_{q\_fin}$) based on the output of the voltage compensation value vector converter 22, the output of the output switcher 5, and the output of the modulation switching determiner 7, and outputs the value to the UVW-phase converter 8 and vector converter 9. The details of the voltage compensator 23 will be described later with reference to FIG. 5.

The UVW-phase converter 8 converts the dq-axis final voltage command value ($v^*_{d\_fin}$, $v^*_{q\_fin}$) to a 3-phase voltage command value $v^*_u$, $v^*_v$, $v^*_w$ as in Equation (1) below based on the electrical angle θ of the motor 17, and outputs the value.

[Equation 1]

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v^*_{d\_fin} \\ v^*_{q\_fin} \end{bmatrix} \quad (1)$$

The vector converter 9 uses the dq-axis final voltage command value ($v^*_{d\_fin}$, $v^*_{q\_fin}$) output from the voltage compensator 23 and converts it to the final voltage norm $v^*_{a\_fin}$ and final voltage phase $\alpha^*_{fin}$ of the voltage vector based on the following Equation (2).

[Equation 2]

$$\begin{cases} V^*_{a\_fin} = \sqrt{v^{*2}_{d\_fin} + v^{*2}_{q\_fin}} \\ \alpha^*_{fin} = \tan^{-1} \frac{-v^*_{d\_fin}}{v^*_{q\_fin}} \end{cases} \quad (2)$$

The synchronization pulse number determining unit 10 calculates the synchronization pulse number num based on the absolute value $|\omega_{re}\alpha|$ of the total angular velocity of the electrical angular velocity core (the amount of change per unit time in the electrical angle θ) and the voltage phase angular velocity ωα (the amount of change per unit time in the voltage phase α to be described later).

For the asynchronous PWM control unit 11, a 3-phase voltage command value ($v^*_u$, $v^*_v$, $v^*_w$) is input from the UVW-phase converter 8 and the voltage detection value $V_{dc}$ of the battery (Bat.) is input. The asynchronous PWM control unit 11 generates the high-voltage element drive signals ($D^*_{uua}$, $D^*_{ula}$, $D^*_{vua}$, $D^*_{vla}$, $D^*_{wua}$, $D^*_{wla}$) for realizing an asynchronous PWM control of a so-called triangular wave comparison method based on the magnitude determination (compare match) between a comparison value, which is calculated based on the ratio of the 3-phase voltage command value ($v^*_u$, $v^*_v$, $v^*_w$) to the voltage detection value $V_{dc}$, and a triangular carrier wave with a constant frequency, and outputs the signals to the PWM output switcher 13. The details of the asynchronous PWM control unit 11 will be described later with reference to FIG. 14.

The synchronous PWM control unit 12 calculates the high-voltage element drive signals in which the switching frequency of the inverter 14 is synchronized with the electrical angular frequency (drive frequency) of the motor 17. Specifically, the synchronous PWM control unit 12 generates the high-voltage element drive signals ($D^*_{uus}$, $D^*_{uls}$, $D^*_{vus}$, $D^*_{vis}$, $D^*_{wus}$, $D^*_{wls}$) in which the switching frequency of the inverter 14 is synchronized with the electrical angular frequency of the motor 17 based on the final voltage norm $V^*_{a\_fin}$, final voltage phase $\alpha^*_{fin}$, electrical angle θ, voltage detection value $V_{dc}$, and synchronization pulse number num, and outputs the signals to the PWM output switcher 13. The details of the synchronous PWM control unit 12 will be described later with reference to FIG. 15.

The PWM output switcher 13 outputs the high-voltage element drive signals according to the modulation mode determined by the modulation switching determiner 7. Specifically, the PWM output switcher 13 selects either the high-voltage element drive signals output by the asynchronous PWM control unit 11 or the high-voltage element drive signals output by the synchronous PWM control unit 12 according to the modulation mode output by the modulation switching determiner 7, and outputs the signals to the inverter 14 as the high-voltage element drive signals ($D^*_{uu}$, $D^*_{ul}$, $D^*_{vu}$, $D^*_{vl}$, $D^*_{wu}$, $D^*wl$).

The inverter 14 is composed of 3 phases and 6 arms, and includes a total of 6 power elements, 2 for each phase. The inverter 14 generates a 3-phase PWM voltage ($v_u$, $v_v$, $v_w$) by driving each of the power elements based on the high-voltage element drive signals selected and output by the PWM output switcher 13. The generated 3-phase PWM voltage ($v_u$, $v_v$, $v_w$) is applied to the motor 17.

Since the motor 17 is driven with 3 phases, the inverter 14 and the motor 17 are connected by 3 wires corresponding to the 3 phases. The U-phase PWM voltage vu is input to the motor 17 via the u-phase wiring, the V-phase PWM voltage $v_v$ is input to the motor 17 via the v-phase wiring, and the W-phase PWM voltage $v_w$ is input to the motor 17 via the w-phase wiring.

The current detector 15 detects currents in at least two of the 3 phases (for example, $i_u$, $i_v$). Further, since the sum of $i_u$, $i_v$, and $i_w$, which are 3-phase currents, becomes zero, the w-phase current value $i_w$ can be obtained by $-i_u-i_v$.

The dq-axis converter 19 converts the current (for example, $i_u$, $i_v$) detected by the current detector 15 to the dq-axis current detection value ($i_d$, $i_q$) based on the electrical angle θ using the following Equation (3).

[Equation 3]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u-i_v \end{bmatrix} \quad (3)$$

The voltage sensor 18 detects the drive voltage supplied from the battery (Bat.) to the inverter 14. The rotor position sensor 16 detects the electrical angle θ. Further, the rotation speed calculator 20 calculates and outputs the rotation speed N based on the amount of change per unit time in the electrical angle θ.

Further, the above components (excluding the inverter 14 and the motor 17) are configured as at least one functional unit included in the controller (control apparatus).

The controller is composed of, for example, a central processing unit (CPU), a read only memory (ROM), a random access memory (RAM), and an input/output interface (I/O interface), and can calculate the torque command value T*.

<Voltage Compensation Value Generator>

Figure 3:
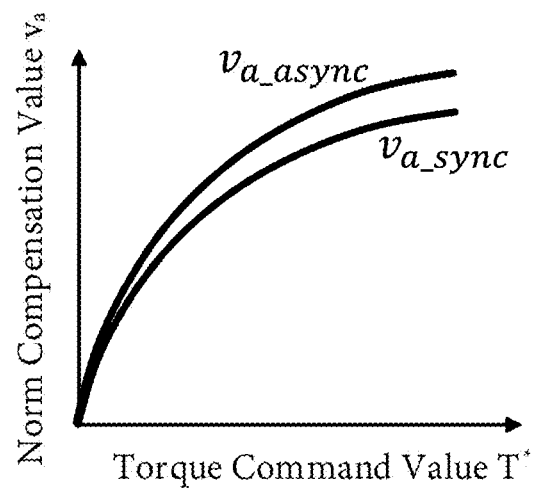
FIG. 3 includes a table (the upper side) showing a relation between a torque command value and a voltage norm compensation value of a voltage vector, and a table (the lower side) showing a relation between the torque command value and a voltage phase compensation value of the voltage vector.
Figure 3:
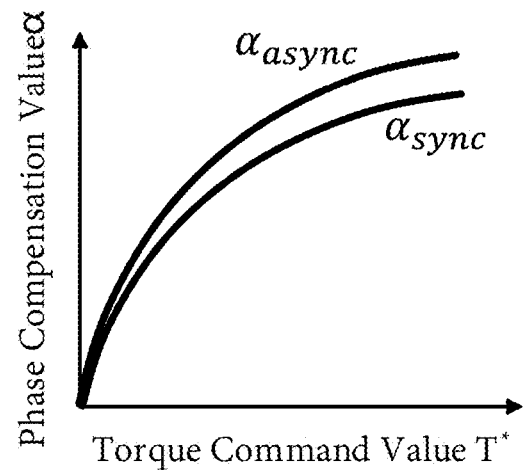

FIG. 3 includes a table (the upper side) showing a relation between a voltage norm compensation value of a voltage vector and a torque command value T*, and a table (the lower side) showing a relation between the torque command value T* and a voltage phase compensation value of the voltage vector.

The voltage compensation value generator 21 outputs the asynchronous transfer voltage norm compensation value $v_{a\_async}$ with reference to the upper table ($v_{a\_async}$) of FIG. 3 and outputs the asynchronous transfer voltage phase compensation value $\alpha_{async}$ with reference to the lower table ($\alpha_{async}$) of FIG. 3 based on the torque command value T* (a state quantity that correlates with the components in the rotating coordinate system (dq-axis) of the voltage applied to the motor 17).

Similarly, the voltage compensation value generator 21 outputs the synchronous transfer voltage norm compensation value $v_{a\_sync}$ with reference to the upper table ($v_{a\_sync}$) of FIG. 3 and outputs the synchronous transfer voltage phase compensation value $\alpha_{sync}$ with reference to the lower table ($\alpha_{async}$) of FIG. 3 based on the torque command value T*.

As shown in FIG. 3, the voltage norm compensation value $v_a$ and the voltage phase compensation value α increase monotonically as the torque command value T* increases, but the amounts of increase decrease, and further, regarding the voltage norm compensation value $v_a$ and voltage phase compensation value α, the compensation values when the modulation mode switches from asynchronous PWM control to synchronous PWM control ($V_{a\_async}$, $\alpha_{async}$) are respectively larger than the compensation values when the modulation mode switches from synchronous PWM control to asynchronous PWM control ($v_{a\_sync}$, $\alpha_{sync}$), but the magnitude relation may be reversed depending on the specifications, etc. of the motor 17.

<Voltage Compensation Value Vector Converter>

Figure 4:
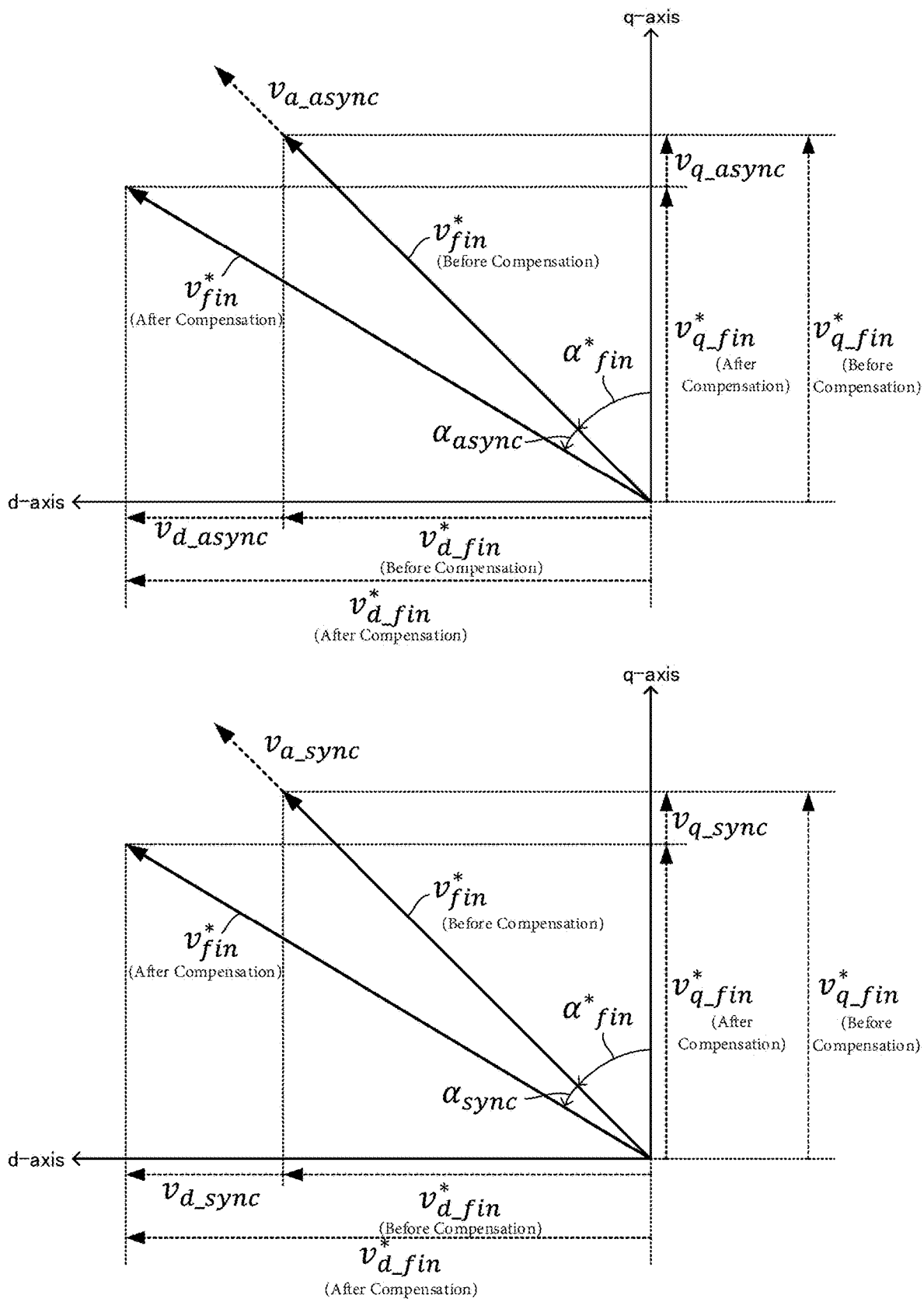
FIG. 4 includes a diagram (the upper side) showing a relation between voltage vectors when the modulation mode switches from synchronous PWM control to asynchronous PWM control, and a diagram (the lower side) showing a relation between voltage vectors when the modulation mode switches from asynchronous PWM control to synchronous PWM control.

FIG. 4 includes a diagram (the upper side) showing a relation between voltage vectors when the modulation mode switches from synchronous PWM control to asynchronous PWM control, and a diagram (the lower side) showing a relation between voltage vectors when the modulation mode switches from asynchronous PWM control to synchronous PWM control.

The voltage compensation value vector converter 22 outputs the dq-axis voltage compensation value ($v_{d\_async}$, $v_{q\_async}$) when transferring to asynchronous PWM control according to the following Equation (4) using the output of the voltage compensation value generator 21, the previous value of the d-axis final voltage command value $v^*_{d\_fin}$, the previous value of the q-axis final voltage command value $v^*_{q\_fin}$, and the $v^*_{afin}$ and $\alpha^*_{fin}$ output from the vector converter 9.

[Equation 4]

$$\begin{cases} v_{d\_async} = -(v^*_{a\_fin} + v_{a\_async}) \cdot \sin(\alpha^*_{fin} + \alpha_{async}) - v^*_{d\_fin} \\ v_{q\_async} = (v^*_{a\_fin} + v_{a\_async}) \cdot \cos(\alpha^*_{fin} + \alpha_{async}) - v^*_{q\_fin} \end{cases} \quad (4)$$

The voltage compensation value vector converter 22 outputs the asynchronous transfer voltage compensation value ($v_{d\_async}$, $v_{q\_async}$), which is for converting the voltage vector $v^*_{\_fin}$ ($v^*_{d\_fin}$, $v^*_{q\_fin}$) (before compensation) to the voltage vector $v^*_{\_fin}$ ($v^*_{d\_fin}$, $v^*_{q\_fin}$) (after compensation) in the rotating coordinate system (dq-axis), using Equation (4) as shown in the upper side of FIG. 4 when the modulation mode switches from synchronous PWM control to asynchronous PWM control.

Further, the voltage compensation value vector converter 22 outputs the dq-axis voltage compensation value ($v_{d\_sync}$, $v_{q\_sync}$) for transferring to synchronous PWM control by the following Equation (5).

[Equation 5]

$$\begin{cases} v_{d\_sync} = -(v^*_{a\_fin} + v_{a\_sync}) \cdot \sin(\alpha^*_{fin} + \alpha_{sync}) - v^*_{d\_fin} \\ v_{q\_sync} = (v^*_{a\_fin} + v_{a\_sync}) \cdot \cos(\alpha^*_{fin} + \alpha_{sync}) - v^*_{q\_fin} \end{cases} \quad (5)$$

The voltage compensation value vector converter 22 outputs the synchronous transfer voltage compensation value ($v_{d\_sync}$, $v_{q\_sync}$), which is for converting the voltage vector $v^*_{\_fin}$ ($v^*_{d\_fin}$, $v^*_{q\_fin}$) (before compensation) to the voltage vector $v^*_{\_fin}$ ($v^*_{d\_fin}$, $v^*_{q\_fin}$) (after compensation) in the rotating coordinate system (dq-axis), using Equation (5) as shown in the lower side of FIG. 4 when the modulation mode switches from asynchronous PWM control to synchronous PWM control.

Further, if there is no input of $v_{a\_async}$ and $v_{a\_sync}$, Equation (4) and Equation (5) are set with $v_{a\_async}=0$ and $v_{a\_sync}=0$.

<Voltage Compensator>

Figure 5:
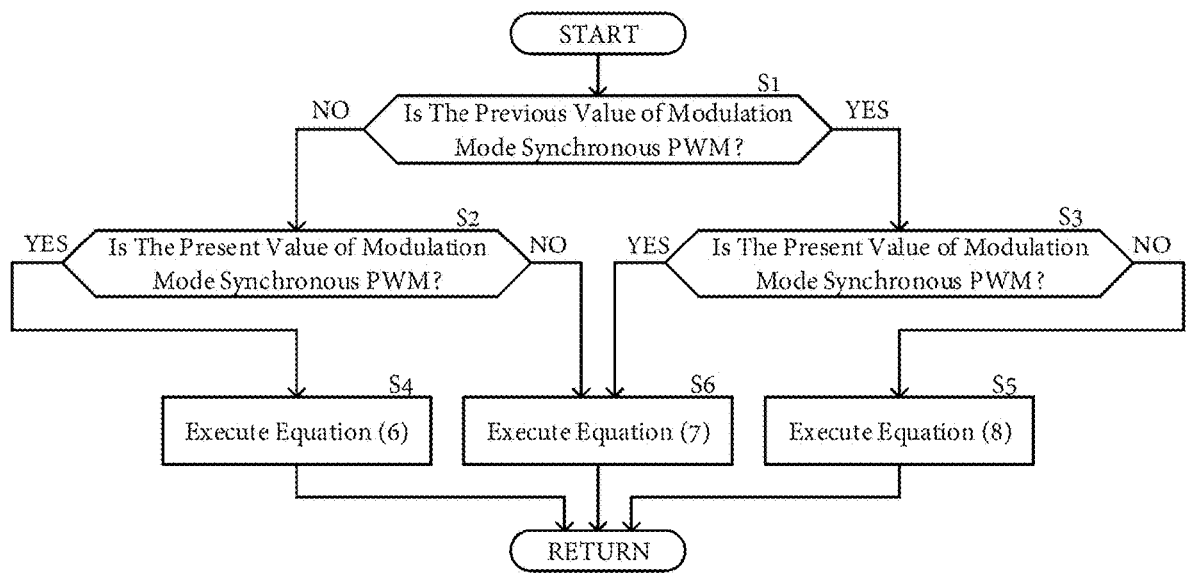
FIG. 5 is a control flow executed by a voltage compensator.

FIG. 5 is a control flow executed by the voltage compensator 23. The voltage compensator 23 executes the processes of Steps S1-S6 shown in FIG. 5.

In Step S1, the voltage compensator 23 determines whether or not the previous value of the modulation mode (asynchronous PWM control or synchronous PWM control) input from the modulation switching determiner 7 is synchronous PWM control (and may determine whether or not the previous value of the modulation mode is asynchronous PWM control, and the same applies hereinafter), and if NO (asynchronous PWM control), the process proceeds to Step S2, and if YES (synchronous PWM control), the process proceeds to Step S3.

In Step S2, the voltage compensator 23 determines whether or not the present value of the modulation mode is synchronous PWM control, and if YES (synchronous PWM control), the process proceeds to Step S4, and if NO (asynchronous PWM control), the process proceeds to Step S5.

In Step S3, the voltage compensator 23 determines whether or not the present value of the signal of the modulation mode is synchronous PWM control, and if NO (asynchronous PWM control), the process proceeds to Step S5, and if YES (synchronous PWM control), the process proceeds to Step S6.

In Step S4, the voltage compensator 23 determines that the modulation mode has switched from asynchronous PWM control to synchronous PWM control, and calculates $v^*_{d\_fin}$ and $v^*_{q\_fin}$ using the following Equation (6). Further, in Equation (6), $v^*_{d\_iv}$ and $v^*_{q\_iv}$ are the outputs of the output switcher 5.

[Equation 6]

$$\begin{cases} v^*_{d\_fin} = v^*_{d\_iv} + v_{d\_sync} \\ v^*_{q\_fin} = v^*_{q\_iv} + v_{q\_sync} \end{cases} \quad (6)$$

In Step S5, the voltage compensator 23 determines that the modulation mode has switched from synchronous PWM control to asynchronous PWM control, and calculates $v^*_{d\_fin}$ and $v^*_{q\_fin}$ using the following Equation (7).

[Equation 7]

$$\begin{cases} v^*_{d\_fin} = v^*_{d\_iv} + v_{d\_async} \\ v^*_{q\_fin} = v^*_{q\_iv} + v_{q\_async} \end{cases} \quad (7)$$

In Step S6, the voltage compensator 23 determines that the modulation mode has not been switched, and calculates $v^*_{d\_fin}$ and $v^*_{q\_fin}$ using the following Equation (8).

[Equation 8]

$$\begin{cases} v^*_{d\_fin} = v^*_{d\_iv} \\ v^*_{q\_fin} = v^*_{q\_iv} \end{cases} \quad (8)$$

<Changes in Voltage Vector and Torque when Switching Modulation Mode>

Figure 6:
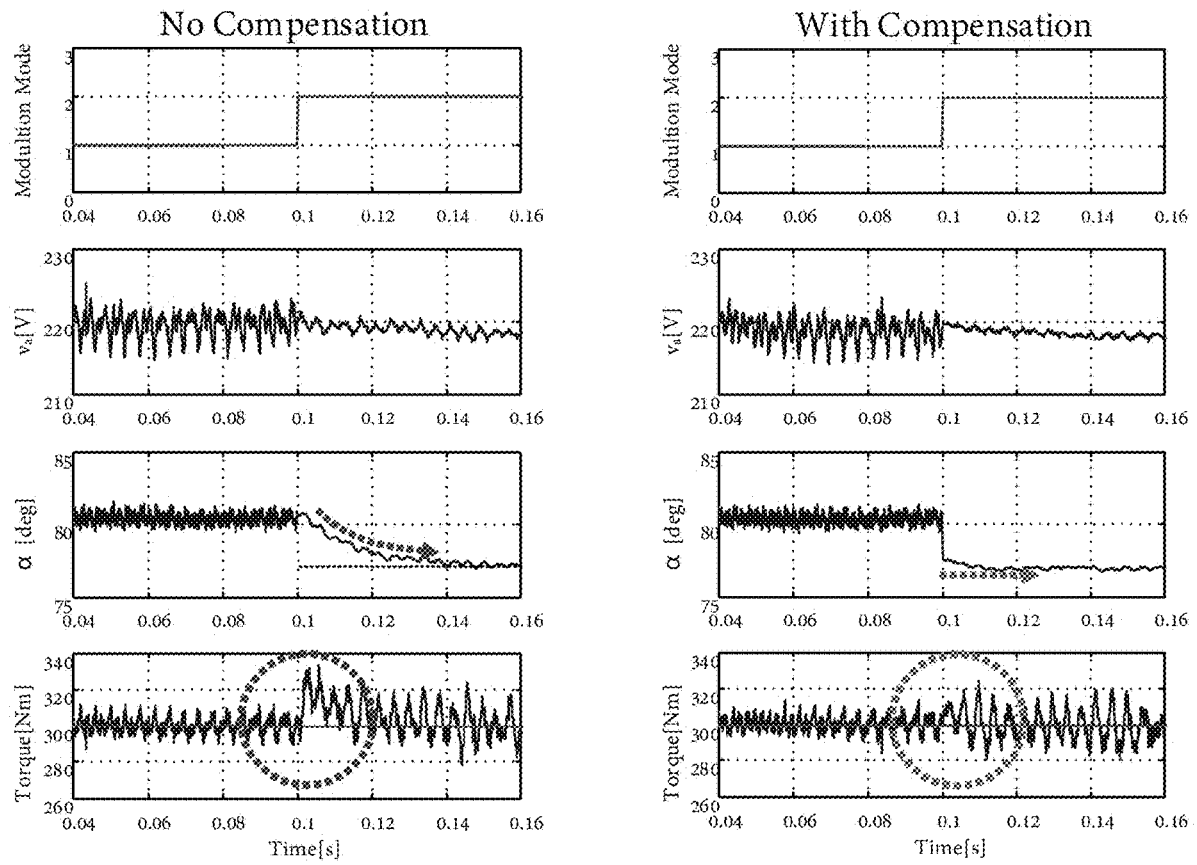
FIG. 6 is a diagram explaining the effects of the electric motor control apparatus of the first embodiment.
Figure 6:
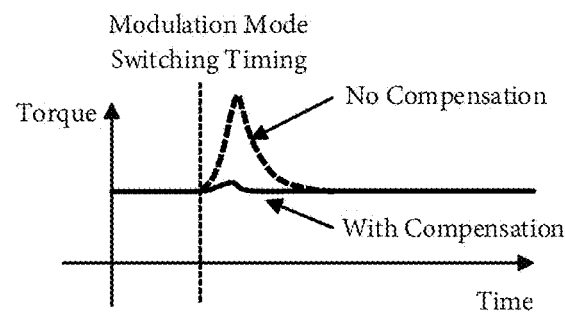

FIG. 6 is a diagram explaining the effects of the electric motor control apparatus of the first embodiment. FIG. 6 shows the voltage norm $v_a$ of the voltage vector, the voltage phase a of the voltage vector, and the change in torque when the modulation mode switches from asynchronous PWM control (modulation mode is "1") to synchronous PWM control (modulation mode is "2").

As shown on the upper left side of FIG. 6, when voltage compensation is not performed based on Equation (3), the voltage phase α changes to converge to the value required (about 77 [deg] in FIG. 6) when switching to synchronous PWM control from the value before switching (about 80 [deg] in FIG. 6) with a predetermined time constant. Here, the current vector control unit 1 and the voltage phase control unit 2 feed back the output to the voltage compensator 23 based on the output ($i_d$, $i_q$) of the dq-axis converter 19, and the aforementioned time constant reflects the time constant of the feedback.

Therefore, immediately after time 0.1 [s], the voltage phase a of the voltage vector deviates from the originally required voltage phase by 80 [deg]−77 [deg]=3 [deg]. Thus, due to this, the torque rises sharply immediately after time 0.1 [s] and converges to the original value according to the aforementioned time constant, but this behavior appears as a torque ripple.

According to the aforementioned JP3276135B, the modulation mode is switched between asynchronous PWM control and synchronous PWM control independently in each phase, and thus, if the timings of switching the modulation mode in each phase are not the same, a plurality of torque ripples may appear in the time direction.

However, as shown on the upper right side of FIG. 6, in this embodiment, the voltage compensator 23 compensates for the output of the output switcher 5 using Equation (6) and outputs the values to the vector converter 9. Thus, the voltage phase α, which is the output of the vector converter 9, immediately changes to the voltage phase required after switching, thereby can reduce torque ripples.

Thus, as shown on the lower side of FIG. 6, if the voltage norm and voltage phase are not respectively compensated for by compensation values when switching the modulation mode, torque ripples will occur at the timing of switching the modulation mode, but if compensations have been performed, the torque ripples at the timing of switching the modulation mode will be reduced.

According to FIG. 6, when the modulation mode switches from asynchronous PWM control to synchronous PWM control, although no change in the voltage norm $v_a$ can be seen, the voltage norm $v_a$ may also change depending on the operating state of the motor 17 (for example, when the rotation speed N of the motor 17 is changed rapidly). In this case as well, if the voltage is not compensated for using Equation (6), similar to the voltage phase α, a curve that converges to the value required after switching with the aforementioned time constant is drawn, and the torque ripples due to this may also occur. However, the voltage compensator 23 compensates for the output of the output switcher 5 using Equation (6) and outputs the values to the vector converter 9, and thereby can also reduce the torque ripples caused by the voltage norm $v_a$.

Further, if the torque ripples caused by the voltage norm $v_a$ are small, the voltage compensation value generator 21 can omit the generation of asynchronous transfer voltage norm compensation value $v_{a\_async}$ and synchronous transfer voltage norm compensation value $v_{a\_sync}$. Further, at this time, the voltage compensation value vector converter 22 can output the dq-axis voltage compensation value ($v_{d\_async}$, $v_{q\_async}$) based on the asynchronous transfer voltage phase compensation value $\alpha_{async}$, and can output the dq-axis voltage compensation value ($v_{d\_sync}$, $v_{q\_sync}$) based on the synchronous transfer voltage phase compensation value $\alpha_{sync}$.

FIG. 6 shows the behavior when the modulation mode switches from asynchronous PWM control to synchronous PWM control, and shows the same behavior when the modulation mode switches from synchronous PWM control to asynchronous PWM control. At this time, the voltage compensator 23 compensates for the output of the output switcher 5 to be described later using Equation (7) and outputs the values to the vector converter 9.

Effects of First Embodiment

According to the electric motor control apparatus of the first embodiment, it is a control apparatus of an electric motor (motor 17) that switches the modulation mode between asynchronous PWM control, which controls the electric motor (motor 17) by fixing the PWM frequency, and synchronous PWM control, which controls the electric motor (motor 17) by making the PWM frequency proportional to the drive frequency of the electric motor (motor 17) (electrical angular frequency of the motor 17), and when switching the modulation mode, the control apparatus calculates a compensation value ($v_{a\_async}$, $\alpha_{async}$, $v_{a\_sync}$, $\alpha_{sync}$) based on a state quantity (for example, torque command value T*) immediately before the switching, that is, the state quantity (for example, torque command value T*) that correlates with the component ($v^*_d$, $v^*_q$ ($v_a$, α)) in the rotating coordinate system (dq-axis) of the voltage (v*) applied to the electric motor (motor 17), and the control apparatus compensates for the voltage ($v^*_{d\_fin}$, $v^*_{q\_fin}$) immediately after the switching by the compensation value ($v_{a\_async}$, $\alpha_{async}$, $v_{a\_sync}$, $\alpha_{sync}$).

With the above configuration, it is possible to suppress the voltage variation (voltage response due to a predetermined time constant) caused by a deviation of the voltage (voltage norm, voltage phase) that may occur when switching the modulation mode from asynchronous PWM control to synchronous PWM control or when switching the modulation mode from synchronous PWM control to asynchronous PWM control, and it is possible to suppress the motor torque variation (torque ripple).

In the first embodiment, the compensation value is a voltage phase component ($\alpha_{async}$, $\alpha_{sync}$) in the rotating coordinate system. Thereby, the motor torque variation at the time of switching the modulation mode can be effectively suppressed by compensating for the voltage phase, which has a large contribution to the suppression of the voltage variation.

In the first embodiment, the state quantity is a command value (torque command value T*) for the electric motor (motor 17) to output a predetermined torque. Thus, by performing voltage compensation based on the torque command value T*, which has a high correlation with the voltage error at the time of switching the modulation mode, it is possible to further suppress the motor torque variation at the time of switching.

According to the electric motor control method of the first embodiment, it is a control method of an electric motor (motor 17) that switches the modulation mode between asynchronous PWM control, which controls the electric motor (motor 17) by fixing the PWM frequency, and synchronous PWM control, which controls the electric motor (motor 17) by making the PWM frequency proportional to the drive frequency of the electric motor (motor 17) (electrical angular frequency of the motor 17), and when switching the modulation mode, the control apparatus calculates a compensation value ($v_{d\_async}$, $v_{q\_async}$, $v_{d\_sync}$, $v_{q\_sync}$) based on a state quantity (for example, torque command value T*) immediately before the switching, that is, the state quantity (for example, torque command value T*) that correlates with the component ($v^*_d$, $v^*_q$) in the rotating coordinate system (dq-axis) of the voltage (v*) applied to the electric motor (motor 17), and the control apparatus compensates for the voltage ($v^*_{d\_fin}$, $v^*_{q\_fin}$) immediately after the switching by the compensation value ($v_{d\_async}$, $v_{q\_async}$, $v_{d\_sync}$, $v_{q\_sync}$).

With the above method, it is possible to suppress the voltage variation (voltage response due to a predetermined time constant) caused by a deviation of the voltage (voltage norm, voltage phase) that may occur when switching the modulation mode from asynchronous PWM control to synchronous PWM control or when switching the modulation mode from synchronous PWM control to asynchronous PWM control, and it is possible to suppress the motor torque variation.

Hereinafter, before explaining the other embodiments, the other components constituting the first embodiment will be described in detail, and first, the details of the current vector control unit 1 will be described with reference to FIG. 7.

<Current Vector Control Unit>

Figure 7:
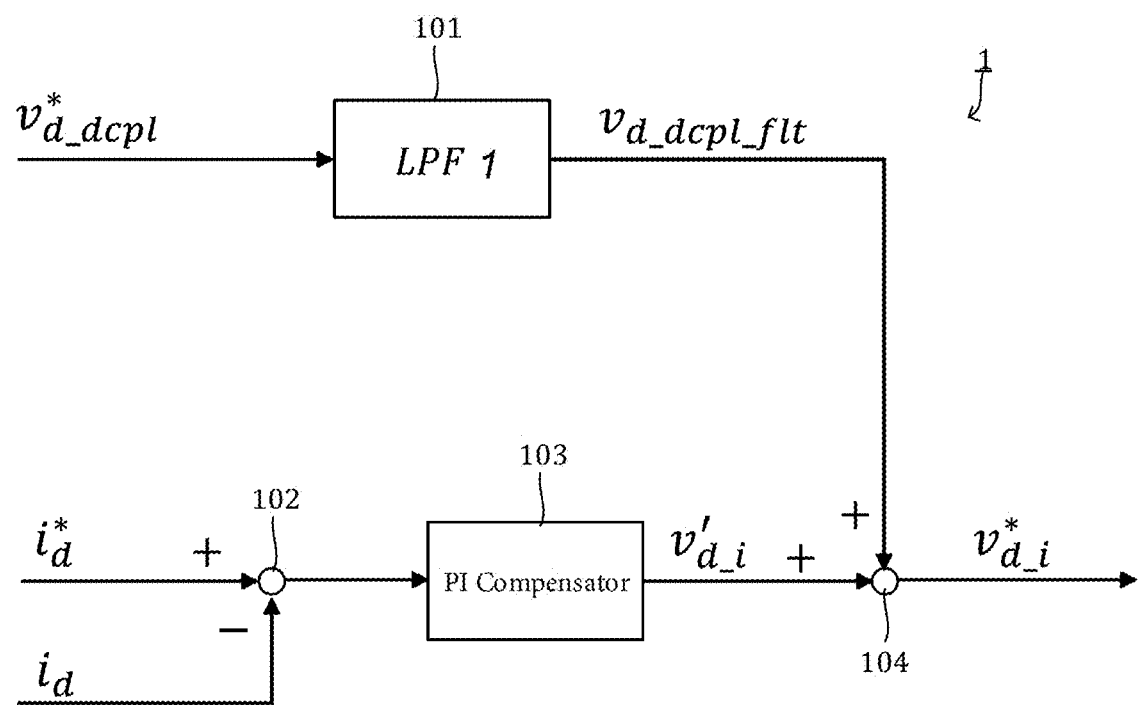
FIG. 7 is a diagram showing details of a current vector control unit.

FIG. 7 is a diagram showing the details of the current vector control unit 1. The current vector control unit 1 includes a filter 101, a subtractor 102, a PI compensator 103, and an adder 104. Note that FIG. 7 shows only the signals related to the calculation of the d-axis voltage command value v*$_{d\_i}$, and omits the signals related to the calculation of the q-axis voltage command value v*$_{q\_i}$, which is input to and output from each block similarly.

The filter 101 is a so-called low pass filter. The filter 101 is a low pass filter considering that the interference voltage depends on the current flowing through the dq-axis, and is set to a time constant which satisfies the target d-axis current responsiveness. The d-axis non-interference voltage command value $v_{d\_dcpl\_flt}$ which has undergone the filtering process is output to the adder 104.

The subtractor 102 calculates the deviation between the d-axis current command value i*$_d$ and the d-axis current detection value i$_d$, and outputs it to the PI compensator 103.

The PI compensator 103 is a calculator that executes the so-called PI control. More specifically, the PI compensator 103 calculates the current feedback voltage command value $v_{di}'$ using the following Equation (9) to perform feedback control based on the deviation between the d-axis current command value i*$_d$ and the d-axis current detection value i$_d$ to make the d-axis current command value i*$_d$ follow the actual current (d-axis current detection value i$_d$). The current feedback voltage command value $v_{di}'$ is output to the adder 104.

[Equation 9]

$$v_{d\_i}^* = \frac{K_{dp}s + K_{di}}{s}(i_d^* - i_d) \quad (9)$$

However, the $K_{dp}$ in Equation (9) indicates the proportional gain on the d-axis, and the $K_{di}$ in Equation (9) indicates the integral gain on the d-axis.

Further, as represented by Equation (10) below, the d-axis voltage command value v*$_{d\_i}$, which suppresses the interference voltage generated when the current flows in the dq-axis, is calculated in the adder 104 by adding the d-axis non-interference voltage command value $v_{d\_dcpl\_flt}$ to the current feedback voltage command value $v_{di}'$ which is output from the PI compensator 103. Further, although omitted in the figure, the q-axis voltage command value v*$_{q\_i}$ is also calculated in the same way as the above d-axis voltage command value v*$_{d\_i}$. The calculated dq-axis voltage command value (v*$_{d\_i}$, v*$_{q\_i}$) is output to output switcher 5.

[Equation 10]

$$v^*_{d\_i} = v_{d\_dcpl\_flt} + v'_{d\_i} \quad (10)$$

Next, the details of the voltage phase control unit 2 will be described with reference to FIG. 8 and FIG. 9.

<Voltage Phase Control Unit>

Figure 8:
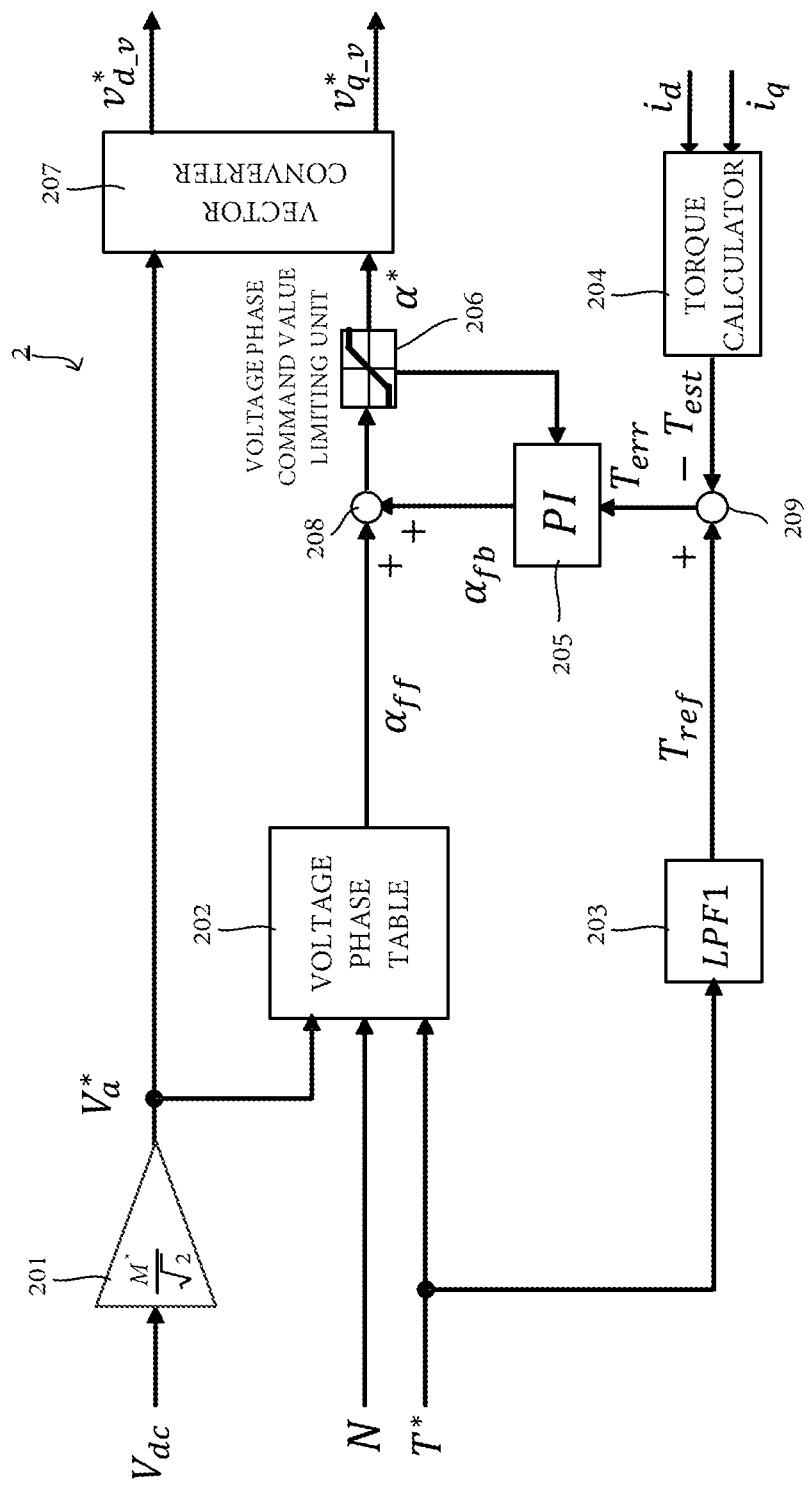
FIG. 8 is a diagram showing details of a voltage phase control unit.

FIG. 8 is a diagram showing the details of the voltage phase control unit 2. The voltage phase control unit 2 includes a modulator 201, a voltage phase table 202, a filter 203, a torque calculator 204, a PI compensator 205, a voltage phase command value limiter 206, a vector converter 207, an adder 208, and a subtractor 209.

The modulator 201 calculates the voltage norm command value V*a using the following Equation (11) based on the voltage detection value Vac of the battery (Bat.) and the reference modulation factor M*, which is a pre-stored value.

[Equation 11]

$$V_a^* = \frac{V_{dc}}{\sqrt{2}} \times M^* \quad (11)$$

The calculated voltage norm command value V*a is output to the voltage phase table 202 and the vector converter 207. Further, the modulation factor here is defined as the ratio of an amplitude of a fundamental wave component of a phase-to-phase voltage (for example, the voltage $v_u$-$v_v$ between the U and V phases) to the voltage detection value $V_{dc}$. When the modulation factor is 1 or less, the voltage norm command value V*a is in a normal modulation region where a pseudo sine wave voltage can be generated by PWM control, and when the modulation factor exceeds 1, the voltage norm command value V*a is in an overmodulation region where the upper and lower limits are limited even if an attempt is made to generate a pseudo sine wave by PWM control. Further, for example, when the modulation factor is 1.1, the output voltage will be the so-called square wave voltage even if an attempt is made to generate a pseudo sine wave by PWM control.

The voltage phase table 202 acquires the voltage phase command value $α_{ff}$ (feedforward voltage phase command value) according to the input torque command value T*, rotation speed N of the motor 17, and voltage norm command value V*$_a$ using a table obtained in advance by experiment or analysis. The voltage phase command value αff is output to the adder 208. Further, the table used here stores the voltage phase command value, which has been measured in advance by experiment, for each operating point of each index in the nominal state.

The torque calculator 204 stores a table showing the relation between the values of the currents flowing to the motor 17 on the d-axis and q-axis and the torque generated in the motor 17, which are measured in advance by experiment, etc. The torque calculator 204 calculates the torque estimation value $T_{est}$ as the estimation value of the torque generated in the motor 17 based on the dq-axis current detection value (i$_d$, i$_q$) with reference to this table, and outputs the calculated value to the subtractor 209.

The filter 203 is a low pass filter, which removes the high-frequency noise of the input torque command value T* (noise cutting process) and outputs the torque command value T* to the subtractor 209 as the torque reference value $T_{ref}$.

The subtractor 209 calculates a deviation Terr between the torque reference value $T_{ref}$ and the torque estimation value $T_{est}$, and outputs the deviation $T_{err}$ to the PI compensator 205.

The PI compensator 205 is a calculator that executes the so-called PI control. The PI compensator 205 calculates the voltage phase command value $α_{fb}$ (feedback voltage phase command value) using the following Equation (12) to perform a feedback control based on the deviation $T_{err}$ between the torque reference value $T_{ref}$ and the torque estimation value $T_{est}$. The calculated voltage phase command value $α_{fb}$ is output to the adder 208.

[Equation 12]

$$\alpha_{fb} = \frac{K_{\alpha p}s + K_{\alpha i}}{s}(T_{ref} - T_{est}) \quad (12)$$

However, the $K\alpha_p$ in Equation (12) indicates a proportional gain, and the $K\alpha_i$ in Equation (12) indicates an integral gain.

The adder 208 outputs the value (voltage phase command value), which is obtained by adding the feedforward voltage phase command value $\alpha_{ff}$ to the feedback voltage phase command value $\alpha_{fb}$, to the voltage phase command value limiter 206.

The voltage phase command value limiter 206 limits the output value of the adder 208 to a predetermined range from αmin to αmax, and outputs the limited value as the voltage phase command value α* to the vector converter 207. The predetermined range here from αmin to αmax (hereinafter also referred to as "upper and lower limit values of α") will be described with reference to FIG. 4.

Figure 9:
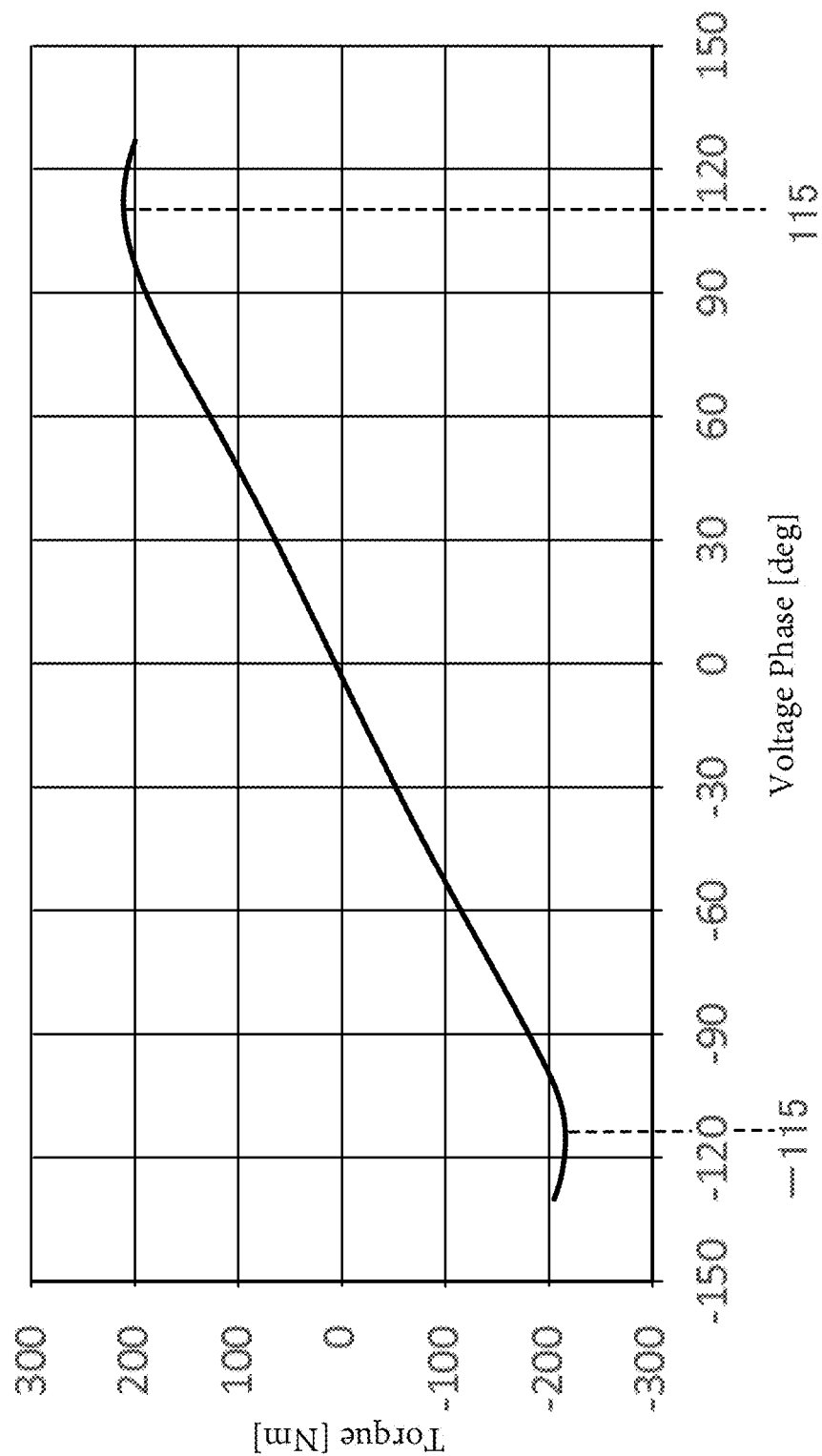
FIG. 9 is a diagram showing a relation between a voltage phase and a torque.

FIG. 9 is a diagram showing an example of the relation between the voltage phase and the torque of the motor 17. If the motor 17 which is the target to be controlled exhibits, for example, the characteristics shown in FIG. 9, the peak to peak of the curve in the figure, ±115°, is set to be the upper and lower limit values of a as the range in which the correlation between the voltage phase and the torque is maintained.

Further, the voltage phase command value limiter 206 sends a signal to the PI compensator 205 notifying that the voltage phase command value α* is limited by the upper and lower limit values of α when a value output from the adder 208 (voltage phase command value) is exceeding the upper or lower limit value of α (when the value is staying at the upper or lower limit value of α). The PI compensator 205 stops updating the integral value for the so-called anti-windup when being notified by the signal that the voltage phase command value α* is limited.

The vector converter 207 calculates the dq-axis voltage command value (v*$_{d\_v}$, v*$_{q\_v}$) using the following Equation (13) by inputting the voltage norm command value V*a output from the modulator 201 and the voltage phase command value α* after the limit processing by the voltage phase command value limiter 206. The calculated dq-axis voltage command value (v*$_{d\_v}$, v*$_{q\_v}$) is output to the output switcher 5.

[Equation 13]

$$\begin{cases} v^*_{d\_v} = -V^*_a \sin\alpha^* \\ v^*_{q\_v} = V^*_a \cos\alpha^* \end{cases} \quad (13)$$

Next, the details of the output switcher 5 will be described with reference to FIG. 10.

<Output Switcher>

Figure 10:
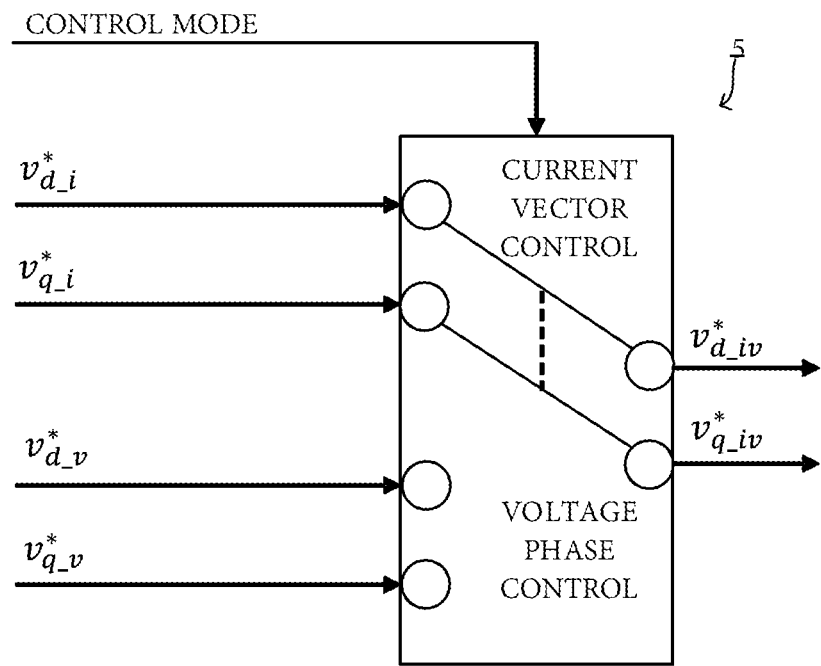
FIG. 10 is a diagram showing details of an output switcher.

FIG. 10 is a diagram showing the details of the output switcher 5. As shown in FIG. 10, the output switcher 5 switches between current vector control and voltage phase control according to the control mode signal.

When the control mode signal indicates current vector control, the output switcher 5 outputs the d-axis voltage command value v*$_{d\_i}$, which is output from the current vector control unit 1, as the v*$_{d\_iv}$, and outputs the q-axis voltage command value v*$_{q\_i}$ as the v*$_{q\_iv}$, respectively.

When the control mode signal indicates voltage vector control, the output switcher 5 outputs the d-axis voltage command value v*$_{d\_v}$, which is output from the voltage phase control unit 2, as the v*$_{d\_iv}$, and outputs the q-axis voltage command value v*$_{q\_v}$ as the v*$_{q\_iv}$. The dq-axis final voltage command value (v*$_{d\_iv}$, v*$_{q\_iv}$) output by the output switcher 5 is input to the voltage compensator 23.

Next, the details of the control switching determiner 6 will be described with reference to FIG. 11 and FIG. 12.

<Control Switching Determiner>

Figure 11:
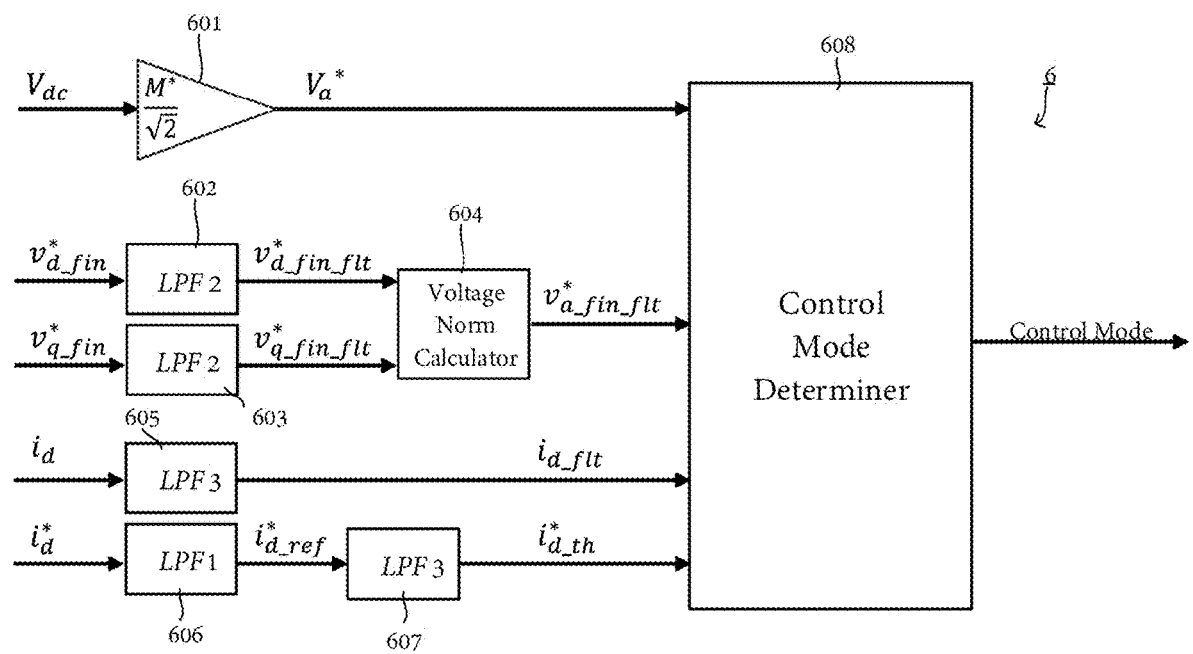
FIG. 11 is a diagram showing details of a control switching determiner.

FIG. 11 is a diagram showing the details of the control switching determiner 6. The control switching determiner 6 includes a modulator 601, filters 602, 603, 605, 606, 607, a voltage norm calculator 604, and a control mode determiner 608.

The modulator 601 calculates the voltage norm command value V*$_a$ using the above Equation (11) based on the voltage detection value V$_{dc}$ of the battery (Bat.) and the reference modulation factor M*, which is a pre-stored value, in the same way as the modulator 201 described with reference to FIG. 8. The calculated voltage norm command value V*$_a$ is input to the control mode determiner 608. The voltage norm command value V*$_a$ is used in the control mode determiner 608 as an index of whether or not the control mode can be switched to voltage phase control.

The filters 602 and 603 are low pass filters set to equivalent characteristics, and the d-axis final voltage command value v*$_{d\_fin\_flt}$ and q-axis final voltage command value v*$_{q\_fin\_flt}$, which are obtained by applying the noise cutting process to the d-axis final voltage command value v*$_{d\_fin}$ and q-axis final voltage command value v*$_{q\_fin}$ input respectively to the filters 602 and 603, are output to the voltage norm calculator 604.

The voltage norm calculator 604 calculates the averaged voltage norm V*$_{a\_fin\_flt}$ using the following Equation (14) based on the input d-axis final voltage command value v*$_{d\_fin\_flt}$ and q-axis final voltage command value v*$_{q\_fin\_flt}$. The calculated averaged voltage norm V*$_{a\_fin\_flt}$ is input to the control mode determiner 608. The averaged voltage norm V*$_{a\_fin\_flt}$ is used in the control mode determiner 608 as an index of whether or not the control mode can be switched to voltage phase control.

[Equation 14]

$$v^*_{a\_fin\_flt} = \sqrt{v^{*2}_{d\_fin\_flt} + v^{*2}_{q\_fin\_flt}} \quad (14)$$

The filter 605 is a low pass filter, which obtains an averaged d-axis current detection value id_flt by applying a noise cutting process to the input d-axis current detection value i$_d$, and outputs the averaged d-axis current detection value i$_{d\_flt}$ to the control mode determiner 48. The averaged d-axis current detection value i$_{d\_flt}$ is used in the control mode determiner 608 as an index of whether or not the control mode can be switched to current vector control.

The filter 606 is a low pass filter having the same characteristics as the filter 203 shown in FIG. 8, and the filter 606 applies the noise cutting process to the input d-axis current command value i*$_d$ and outputs the d-axis current reference value i*$_{d\_ref}$. The d-axis current reference value i*$_{d\_ref}$ is output to the filter 607.

The filter 607 is a low pass filter having the same characteristics as the filter 605. The filter 607 obtains the d-axis current threshold value i*$_{d\_th}$ by applying a filtering process to the d-axis current reference value i*$_{d\_ref}$ for the purpose of matching the delay with the side of the d-axis current detection value i$_{d\_flt}$, and outputs the d-axis current threshold value i*$_{d\_th}$ to the control mode determiner 608.

The d-axis current threshold value $i^*_{d\_th}$ is used in the control mode determiner 608 as an index of whether or not the control mode can be switched to current vector control.

The control mode determiner 608 determines whether or not a current vector control can be (needs to be) switched to voltage phase control and whether or not a voltage phase control can be (needs to be) switched to current vector control. Specifically, it will be described with reference to FIG. 12.

Figure 12:
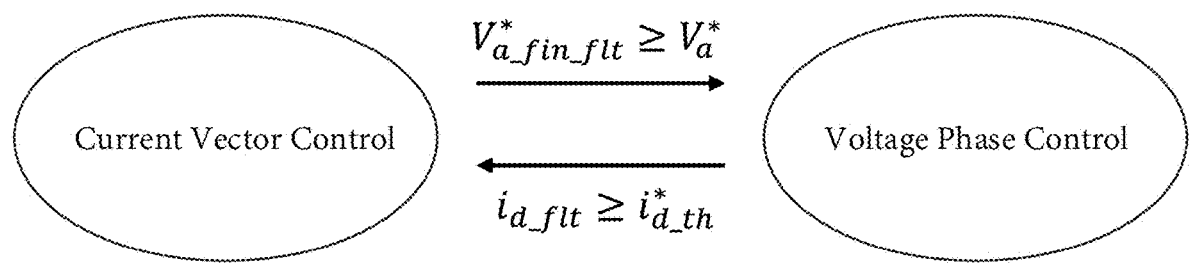
FIG. 12 is a diagram showing the determination criterion of the control switching determiner.

FIG. 12 is a diagram showing a determination criterion of the control switching determiner 6 (control mode determiner 608). As shown in FIG. 12, when current vector control is selected, the control mode determiner 608 determines to switch from current vector control to voltage phase control if it is detected that the averaged voltage norm $V^*_{a\_fin\_flt}$ is equal to or greater than the voltage norm command value $V^*_a$. Further, when voltage phase control is selected, the control mode determiner 608 determines to switch from voltage phase control to current vector control if it is detected that the averaged d-axis current detection value $i_{d\_flt}$ is equal to or greater than the d-axis current threshold value $i^*_{d\_th}$. The control mode determined in this way is output to the output switcher 5 as a control mode signal.

Next, the details of the modulation switching determiner 7 will be described with reference to FIG. 13, FIG. 14.

<Modulation Switching Determiner>

Figure 13:
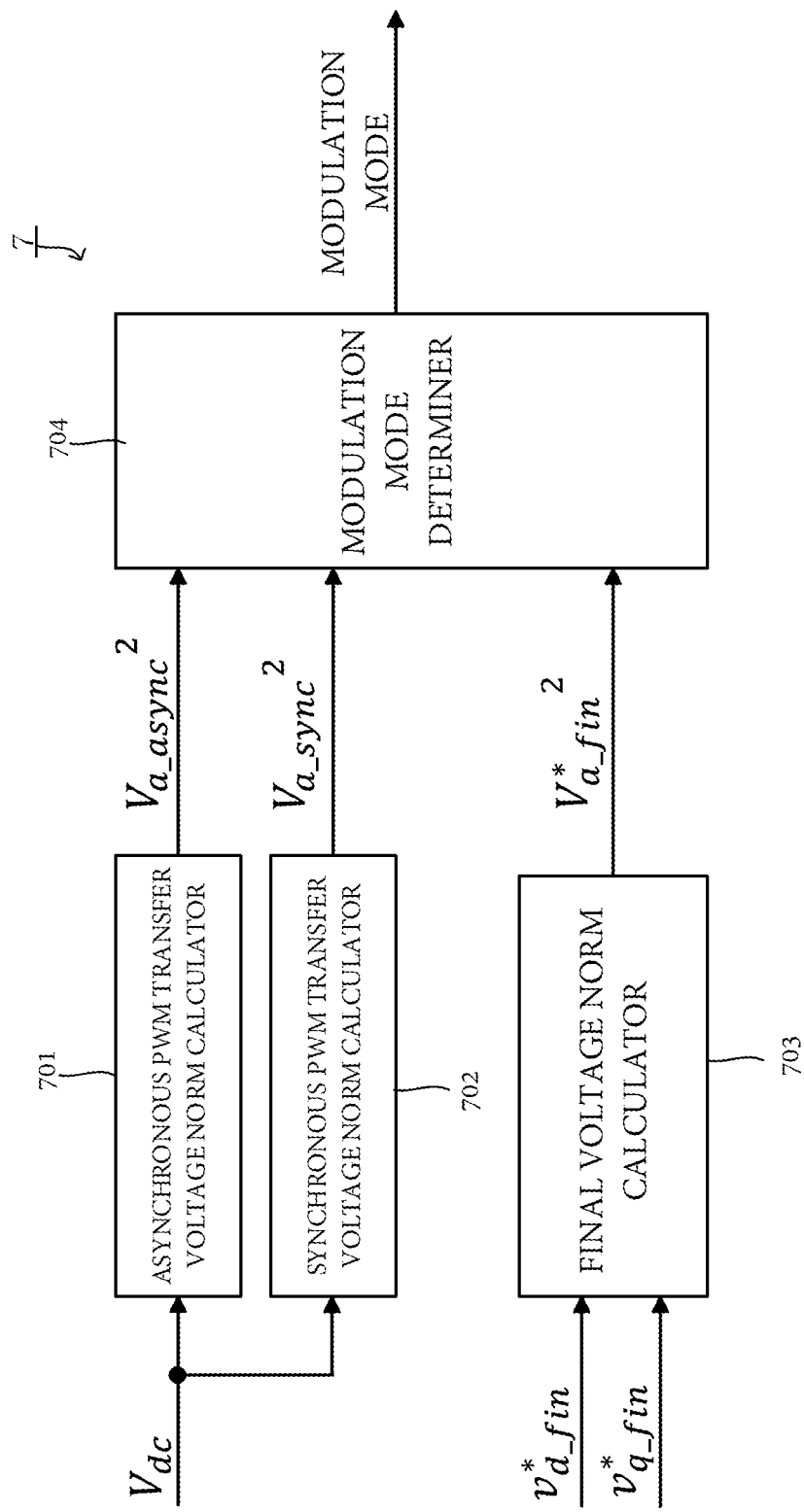
FIG. 13 is a diagram showing details of a modulation switching determiner.

FIG. 13 is a diagram showing the details of the modulation switching determiner 7. The modulation switching determiner 7 includes an asynchronous PWM transfer voltage norm calculator 701, a synchronous PWM transfer voltage norm calculator 702, a final voltage norm calculator 703, and a modulation mode determiner 704.

The asynchronous PWM transfer voltage norm calculator 701 calculates the asynchronous transfer voltage norm $V_{a\_async}$ using the voltage detection value $V_{dc}$ of the battery (Bat.) and the asynchronous PWM transfer modulation factor $M_{async}$ by the following Equation (15), and outputs the asynchronous transfer voltage norm $V_{a\_async}$ to the modulation mode determiner 704.

[Equation 15]

$$V^2_{a\_async} = \left(V_{dc} \times \frac{M_{async}}{\sqrt{2}}\right)^2 \tag{15}$$

The synchronous PWM transfer voltage norm calculator 702 calculates the synchronous transfer voltage norm $V_{a\_sync}$ using the voltage detection value $V_{dc}$ of the battery (Bat.) and the synchronous PWM transfer modulation factor $M_{sync}$ by the following Equation (16), and outputs the synchronous transfer voltage norm $V_{a\_sync}$ to the modulation mode determiner 704.

[Equation 16]

$$V^2_{a\_sync} = \left(V_{dc} \times \frac{M_{sync}}{\sqrt{2}}\right)^2 \tag{16}$$

The final voltage norm calculator 703 calculates the final voltage norm $V^*_{a\_fin}$ using the d-axis final voltage command value $v^*_{d\_fin}$ and q-axis final voltage command value $v^*_{q\_fin}$ output from the vector converter 9 by the following Equation (17), and outputs the final voltage norm $V^*_{a\_fin}$ to the modulation mode determiner 704.

[Equation 17]

$$V^{*2}_{a\_fin} = v^{*2}_{d\_fin} + v^{*2}_{q\_fin} \tag{17}$$

Figure 14:
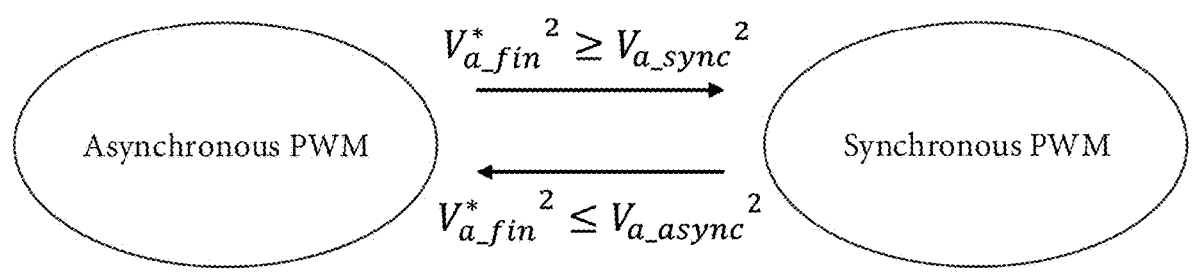
FIG. 14 is a diagram showing the determination criterion of the modulation switching determiner.

FIG. 14 is a diagram showing a determination criterion of the modulation switching determiner 7 (modulation mode determiner 704). The modulation mode determiner 704 compares the asynchronous transfer voltage norm $V_{a\_async}$, synchronous transfer voltage norm $V_{a\_sync}$, and final voltage norm $V^*_{a\_fin}$ to determine the modulation mode to be output. That is, when the $V^{*2}_{a\_fin}$ is equal to or greater than the $V^2_{a\_sync}$, the modulation mode determiner 704 switches the modulation mode from asynchronous PWM control to synchronous PWM control, and when the $V^{*2}_{a\_fin}$ becomes equal to or less than the $V^2_{a\_async}$, the modulation mode determiner 704 switches the modulation mode from asynchronous PWM control to synchronous PWM control.

Next, the details of the asynchronous PWM control unit 11 will be described with reference to FIG. 15.

<Asynchronous PWM Controller>

Figure 15:
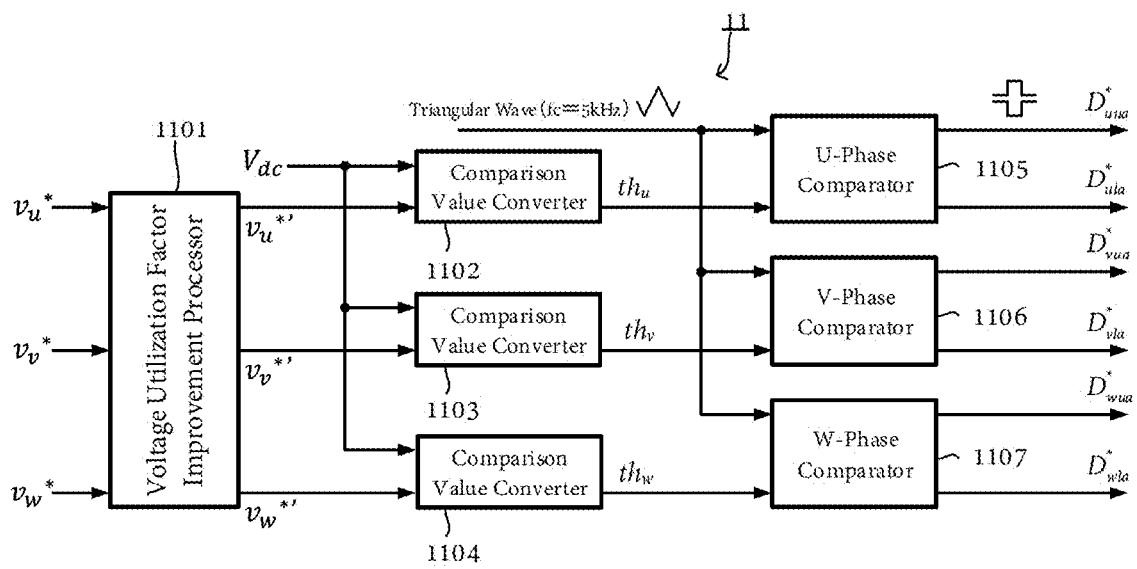
FIG. 15 is a diagram showing details of an asynchronous PWM control unit.

FIG. 15 is a diagram showing the details of the asynchronous PWM control unit 11. The asynchronous PWM control unit 11 includes a voltage utilization factor improvement processor 1101, a U-phase comparison value converter 1102, a V-phase comparison value converter 1103, a W-phase comparison value converter 1104, a U-phase comparator 1105, a V-phase comparator 1106, and a W-phase comparator 1107.

The voltage utilization factor improvement processor 1101 performs a voltage utilization improvement process using a known processing method such as triple harmonic superimposition process to maximize the sine wave generation of phase-to-phase voltage with respect to the input 3-phase voltage command values ($v^*_u$, $v^*_v$, $v^*_w$), and calculates the 3-phase voltage command values (U-phase voltage command value $v^*_{u'}$, V-phase voltage command value $v^*_{v'}$, W-phase voltage command value $v^*_{v'}$). The calculated 3-phase voltage command values (U-phase voltage command value $v^*_{u'}$, V-phase voltage command value $v^*_{v'}$, W-phase voltage command value $v^*_{w'}$) are output to the U-phase comparison value converter 1102, V-phase comparison value converter 1103, and W-phase comparison value converter 1104, respectively.

The U-phase comparison value converter 1102 calculates the U-phase comparison value (duty ratio) $th_u$ using the following Equation (18) based on the voltage detection value $V_{dc}$ of the battery (Bat.) and the U-phase voltage command value $v^*_{u'}$, and outputs the U-phase comparison value (duty ratio) $th_u$ to the U-phase comparator 1105.

[Equation 18]

$$th_v = 50 + \frac{2v^{*'}_v}{V_{dc}} \times 100[\%] \tag{18}$$

The V-phase comparison value converter 1103 calculates the U-phase comparison value (duty ratio) $th_v$ using the following Equation (19) based on the voltage detection value $V_{dc}$ of the battery (Bat.) and the V-phase voltage command value $v^*_{v'}$, and outputs the U-phase comparison value (duty ratio) $th_v$ to the V-phase comparator 1106.

[Equation 19]

$$th_v = 50 + \frac{2v_v^{*\prime}}{V_{dc}} \times 100 [\%] \quad (19)$$

The W-phase comparison value converter 1104 calculates the U-phase comparison value (duty ratio) th$_w$ using the following Equation (20) based on the voltage detection value V$_{dc}$ of the battery (Bat.) and the W-phase voltage command value v*$_w$', and outputs the U-phase comparison value (duty ratio) th$_w$ to the W-phase comparator 1107.

[Equation 20]

$$th_v = 50 + \frac{2v_w^{*\prime}}{V_{dc}} \times 100 [\%] \quad (20)$$

In the comparison calculator (U-phase comparator 1105, V-phase comparator 1106, W-phase comparator 1107) of each phase, high-voltage element drive signals (D*$_{uua}$, D*$_{ula}$, D*$_{vua}$, D*$_{vla}$, D*$_{wua}$, D*$_{wla}$) are generated as PWM pulses during asynchronous PWM control based on the compare match between the triangular carrier wave of constant frequency and the comparison value of each phase (U, V, W-phase comparison values th$_u$, th$_v$, th$_w$), and output to the PWM output switcher 13. Further, the frequency of the triangular carrier wave in this embodiment is set to, for example, 5 kHz.

Figure 16:
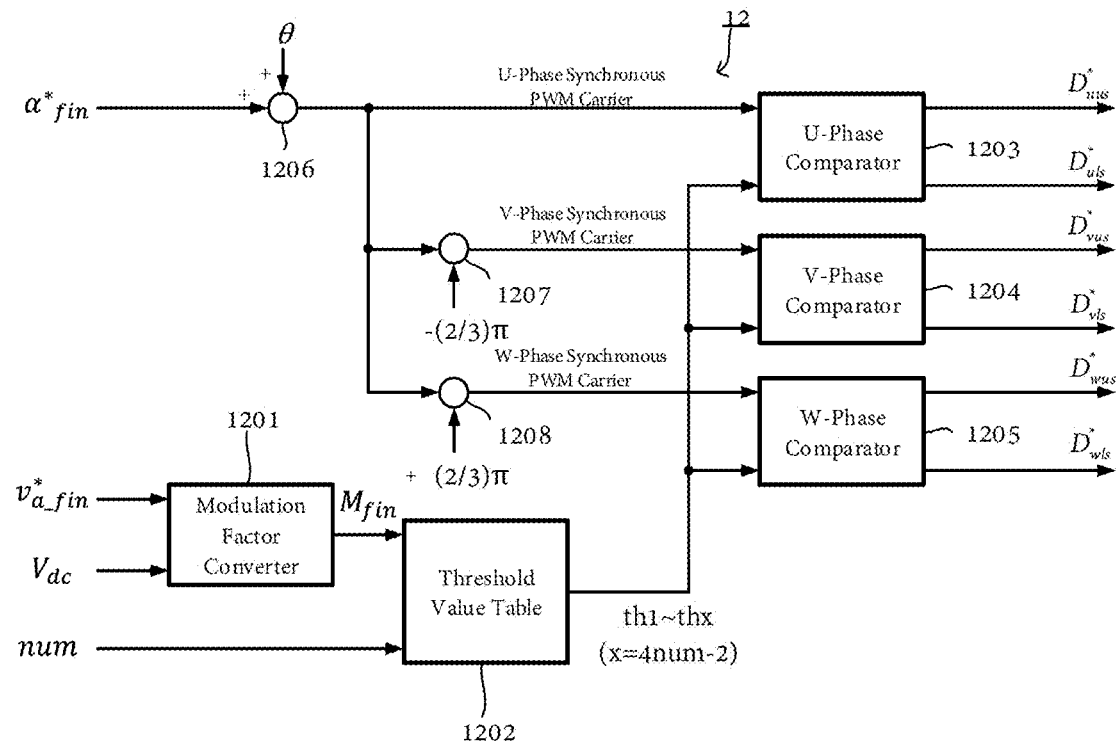
FIG. 16 is a diagram showing details of a synchronous PWM control unit.

Next, the synchronous PWM control unit 12 will be described with reference to FIG. 16.

<Synchronous PWM Control Unit>

The synchronous PWM control unit 12 includes a modulation factor converter 1201, a threshold value table 1202, a U-phase comparator 1203, a V-phase comparator 1204, a W-phase comparator 1205, an adder 1206, and shifters 1207, 1208. In the synchronous PWM control unit 12 of this embodiment, the synchronous PWM control of the so-called voltage phase reference method is executed, wherein the electrical angle θ of the motor 17 is used as the reference for the carrier signal to generate a pulse based on the compare match between the carrier signal and the voltage phase to be PWM-switched, which is set as the threshold value.

The synchronous PWM control unit 12 outputs the value obtained by adding the final voltage phase α*$_{fin}$ and the electrical angle θ (θ+α*$_{fin}$) using the adder 1206 as the U-phase carrier signal (U-phase synchronous PWM carrier signal) to the U-phase comparator 1203 as well as shifters 1207 and 1208.

The shifter 1207 calculates a signal whose voltage phase is shifted by −2/3π with respect to the output of the adder 1206 as a V-phase carrier signal (V-phase synchronous PWM carrier signal), and outputs it to the V-phase comparator 1204.

The shifter 1208 calculates a signal whose voltage phase is shifted by +2/3π with respect to the output of the adder 1206 as a W-phase carrier signal (W-phase synchronous PWM carrier signal), and outputs it to the W-phase comparator 1205.

The modulation factor converter 1201 calculates the modulation factor M$_{fin}$ using the following Equation (21) based on the final voltage norm v*$_{a\_fin}$ and the voltage detection value V$_{dc}$ of the battery (Bat.), and outputs it to the threshold value table 1202.

[Equation 21]

$$M_{fin} = \frac{\sqrt{2} \cdot v_{a\_fin}^*}{V_{dc}} \quad (21)$$

The threshold value table 1202 obtains the threshold values th$_1$-th$_x$ corresponding to the modulation factor M$_{fin}$ with reference to the pre-stored threshold value table based on the modulation factor M$_{fin}$ and the required synchronization pulse number num. Here, x is set to the value obtained by multiplying the required synchronization pulse number num by 4 and then subtracting 2 therefrom (x=4×num−2).

Second Embodiment

Figure 17:
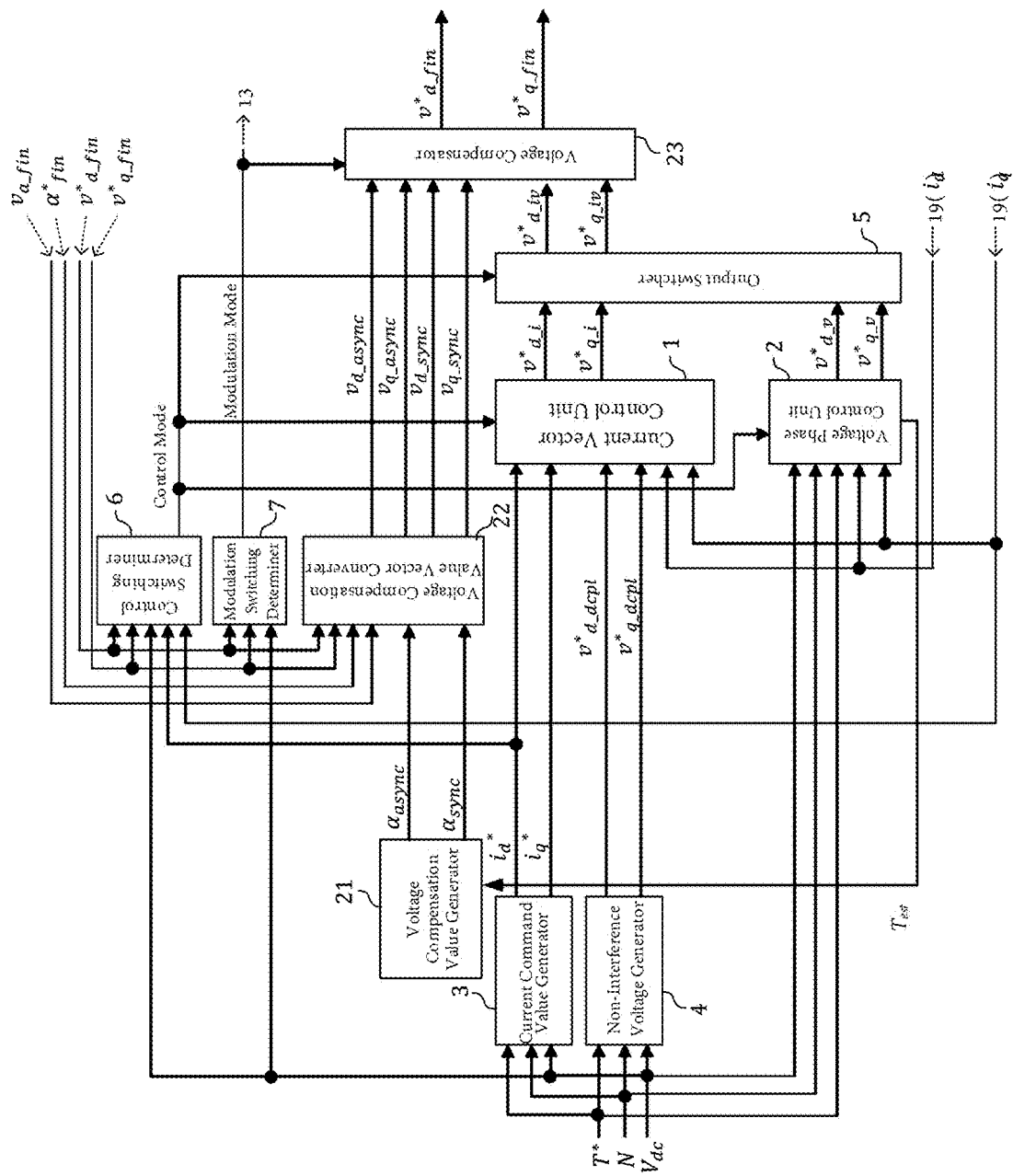
FIG. 17 is a diagram showing a main configuration (torque command value input side) of an electric vehicle to which an electric motor control apparatus of a second embodiment is applied.

FIG. 17 is a diagram showing a main configuration (torque command value input side) of an electric vehicle to which an electric motor control apparatus of a second embodiment is applied. The main configuration of the second embodiment is common to that of the first embodiment, but the voltage compensation value generator 21 includes a table which makes the voltage phase compensation values (α$_{async}$, α$_{sync}$) respectively correspond to the torque estimation value T$_{est}$ (see FIG. 8) generated by the voltage phase control unit 2. Therefore, once the estimation value of the torque (torque estimation value T$_{est}$) output by the motor 17 is input, the voltage compensation value generator 21 generates the voltage phase compensation values (α$_{async}$, α$_{sync}$) based on the table and outputs the voltage phase compensation values (α$_{async}$, α$_{sync}$) to the voltage compensation value vector converter 22.

Third Embodiment

Figure 18:
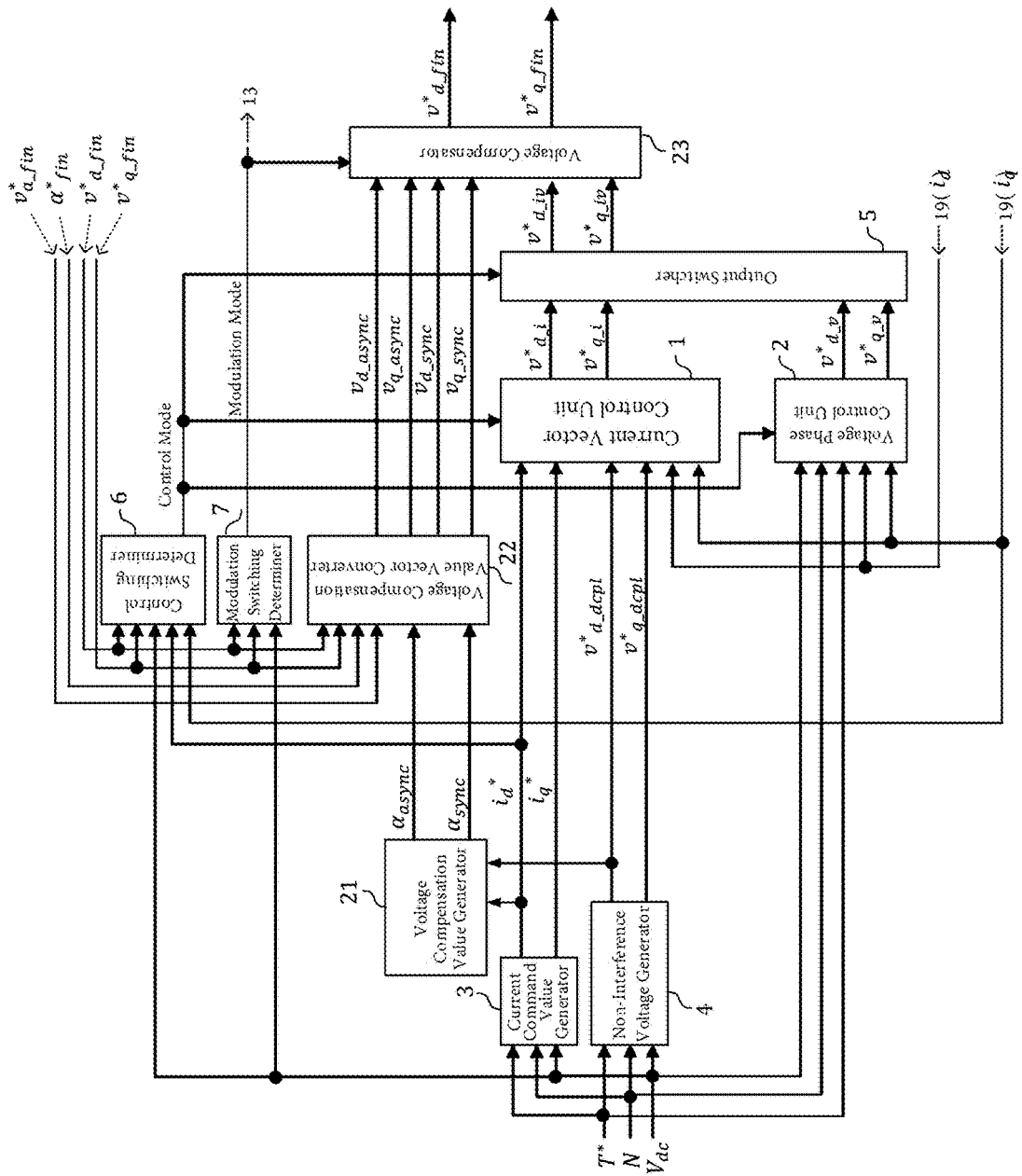
FIG. 18 is a diagram showing a main configuration (torque command value input side) of an electric vehicle to which an electric motor control apparatus of a third embodiment is applied.

FIG. 18 is a diagram showing a main configuration (torque command value input side) of an electric vehicle to which an electric motor control apparatus of a third embodiment is applied. The main configuration of the third embodiment is common to that of the first embodiment, but the voltage compensation value generator 21 includes a table which makes the voltage phase compensation values (α$_{async}$, α$_{sync}$) respectively correspond to the d-axis current command value i*$_d$ (or q-axis current command value i*$_q$) output by the current command value generator 3. Therefore, once a command value for outputting a predetermined current from the inverter 14 to the motor 17, that is, the d-axis current command value i*$_d$ (or q-axis current command value i*$_q$), is input, the voltage compensation value generator 21 generates the voltage phase compensation values (α$_{async}$, α$_{sync}$) based on the table and outputs the voltage phase compensation values (α$_{async}$, α$_{sync}$) to the voltage compensation value vector converter 22.

Further, the voltage compensation value generator 21 includes a table which makes the voltage phase compensation values (α$_{async}$, α$_{sync}$) respectively correspond to the non-interference voltage v*$_{d\_dcpl}$ (or v*$_{q\_dcpl}$) output by the non-interference voltage generator 4. Therefore, once a command value for outputting a predetermined current from the inverter 14 to the motor 17, that is, the non-interference voltage v*$_{d\_dcpl}$ (or v*$_{q\_dcpl}$), is input, the voltage compensation value generator 21 generates the voltage phase compensation values (α$_{async}$, α$_{sync}$) based on the table and outputs the voltage phase compensation values (α$_{async}$, α$_{sync}$) to the voltage compensation value vector converter 22.

Fourth Embodiment

Figure 19:
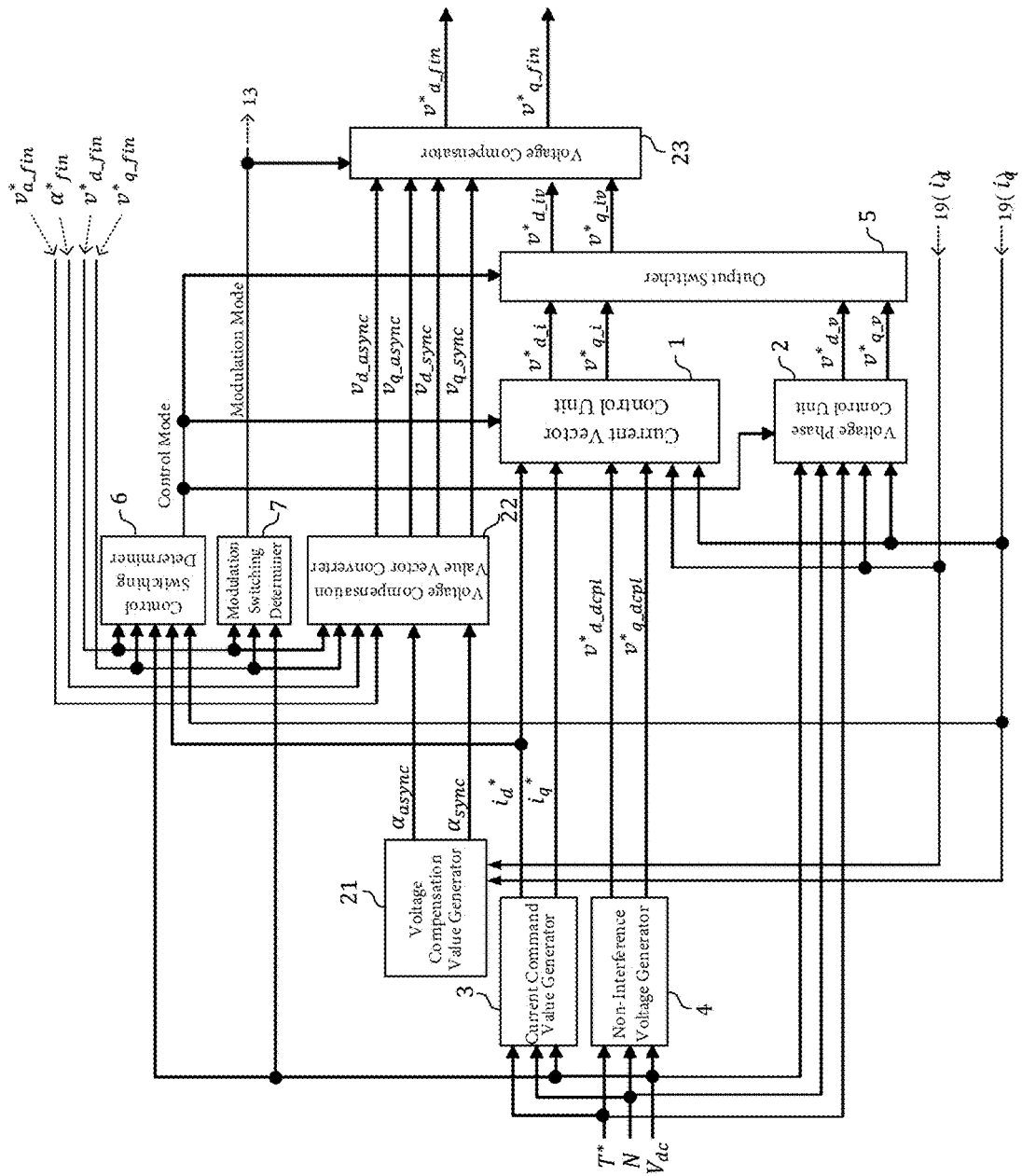
FIG. 19 is a diagram showing a main configuration (torque command value input side) of an electric vehicle to which an electric motor control apparatus of a fourth embodiment is applied.

FIG. 19 is a diagram showing a main configuration (torque command value input side) of an electric vehicle to which an electric motor control apparatus of a fourth embodiment is applied. The main configuration of the fourth embodiment is common to that of the first embodiment, but the voltage compensation value generator 21 includes a table which makes the voltage phase compensation values ($\alpha_{async}$, $\alpha_{sync}$) respectively correspond to the d-axis current detection value $i_d$ (or q-axis current detection value $i_q$) output by the dq-axis converter 19. Therefore, once an estimation value of a current output from the inverter 14 to the motor 17, that is, the d-axis current detection value $i_d$ (or q-axis current detection value $i_q$), is input, the voltage compensation value generator 21 generates the voltage phase compensation values ($a_{async}$, $a_{sync}$) based on the table and outputs the voltage phase compensation values ($\alpha_{async}$, $\alpha_{sync}$) to the voltage compensation value vector converter 22.

Fifth Embodiment

Figure 20:
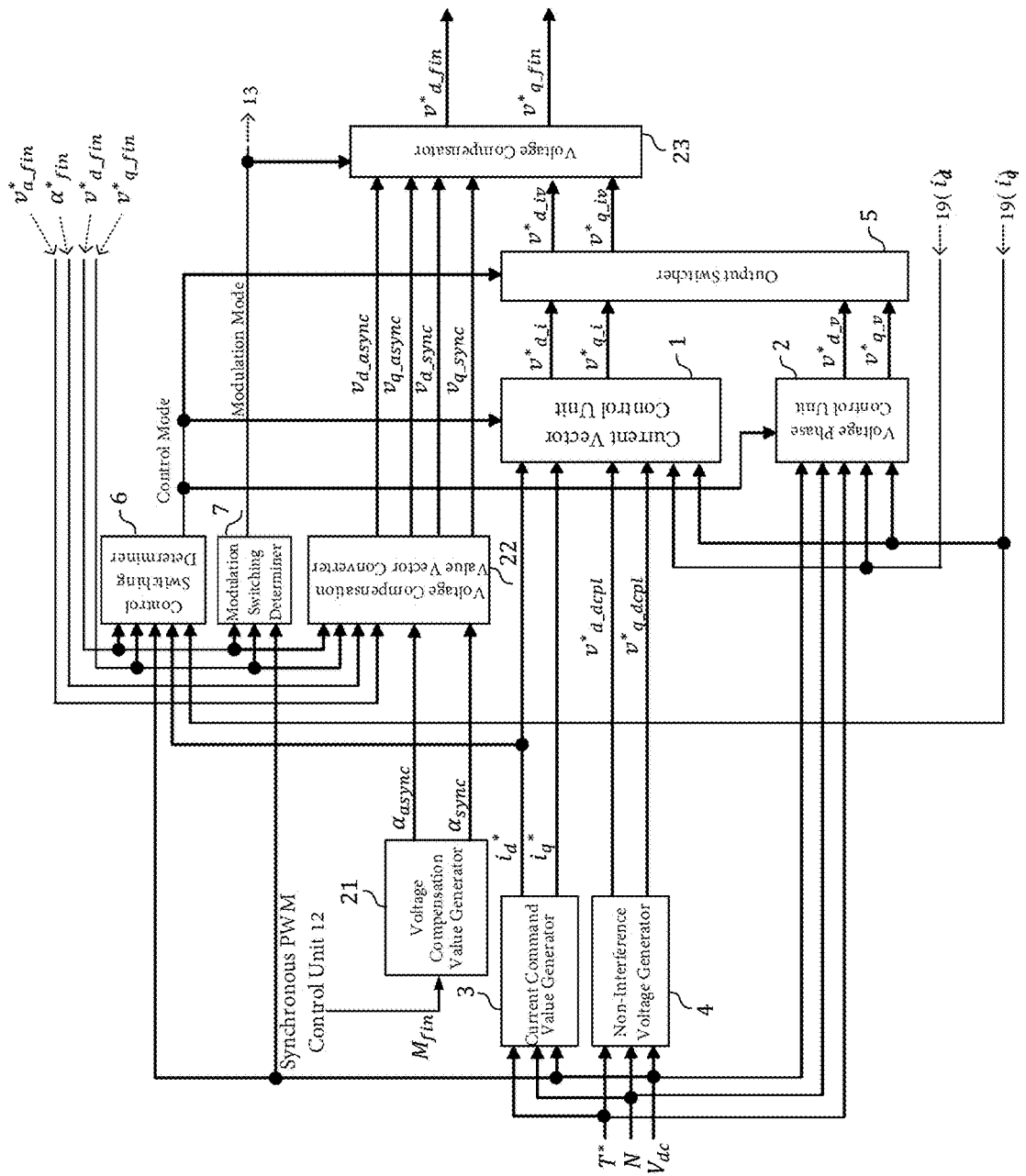
FIG. 20 is a diagram showing a main configuration (torque command value input side) of an electric vehicle to which an electric motor control apparatus of a fifth embodiment is applied.

FIG. 20 is a diagram showing a main configuration (torque command value input side) of an electric vehicle to which an electric motor control apparatus of a fifth embodiment is applied. The main configuration of the fifth embodiment is common to that of the first embodiment, but the voltage compensation value generator 21 includes a table which makes the voltage phase compensation values ($a_{async}$, $a_{sync}$) respectively correspond to the modulation factor $M_{fin}$ generated by the synchronous PWM control unit 12 (modulation factor converter 1201). Therefore, once the modulation factor Mfin is input, the voltage compensation value generator 21 generates the voltage phase compensation values ($\alpha_{async}$, $\alpha_{sync}$) based on the table and outputs the voltage phase compensation values ($\alpha_{async}$, $\alpha_{sync}$) to the voltage compensation value vector converter 22.

Sixth Embodiment

Figure 21:
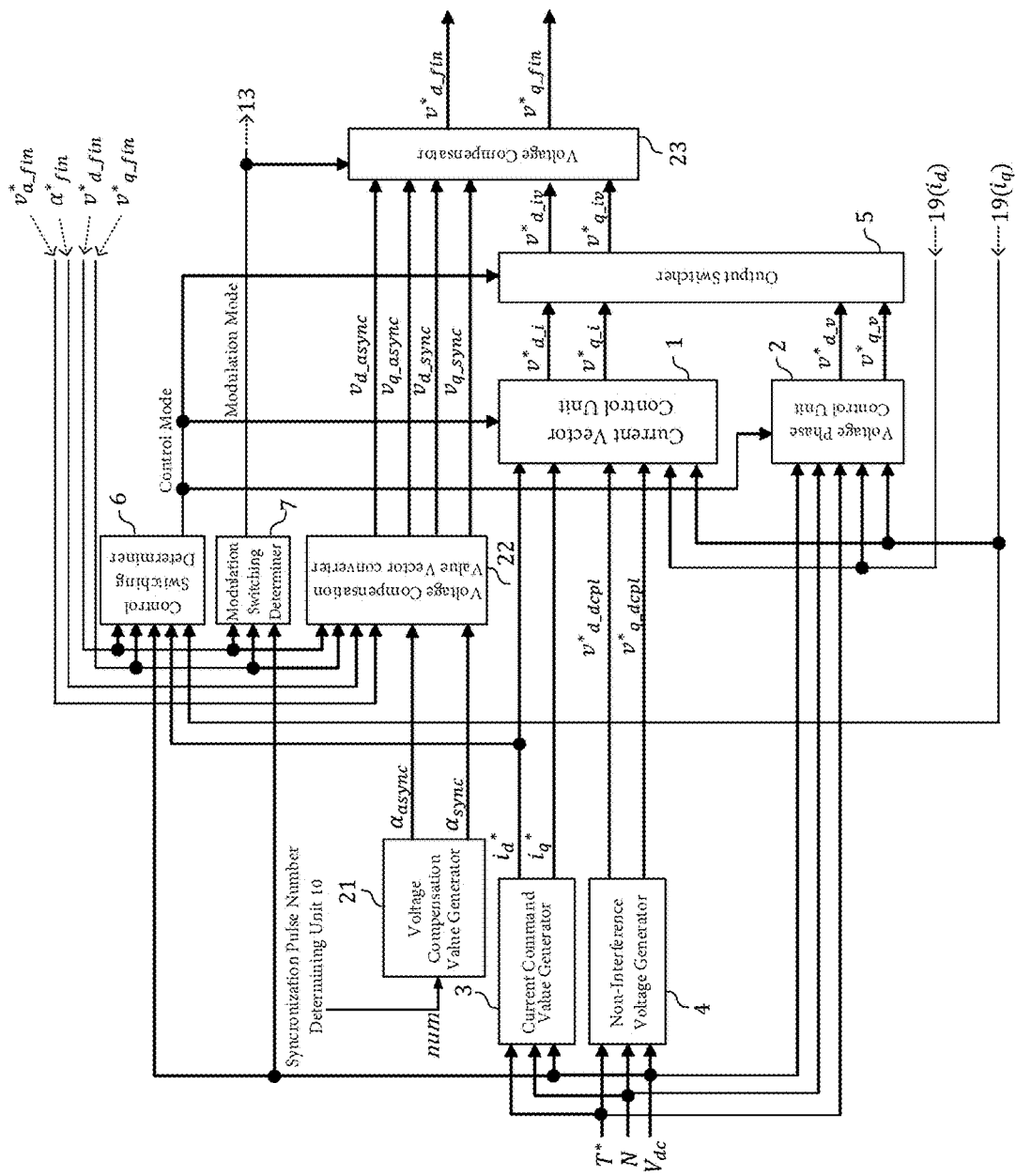
FIG. 21 is a diagram showing a main configuration (torque command value input side) of an electric vehicle to which an electric motor control apparatus of a sixth embodiment is applied.

FIG. 21 is a diagram showing a main configuration (torque command value input side) of an electric vehicle to which an electric motor control apparatus of a sixth embodiment is applied. The main configuration of the sixth embodiment is common to that of the first embodiment, but the voltage compensation value generator 21 includes a table which makes the voltage phase compensation values ($\alpha_{async}$, $\alpha_{sync}$) respectively correspond to the synchronization pulse number num output by the synchronization pulse number determining unit 10. Therefore, once the synchronization pulse number num is input, the voltage compensation value generator 21 generates the voltage phase compensation values ($\alpha_{async}$, $\alpha_{sync}$) based on the table and outputs the voltage phase compensation values ($\alpha_{async}$, $\alpha_{sync}$) to the voltage compensation value vector converter 22.

In the present invention, as state quantities that correlate with the components in the rotating coordinate system of the voltage applied to the motor 17, the torque command value T*, torque estimation value $T_{est}$, d-axis current command value $i^*_d$ (or q-axis current command value $i^*_q$), non-interference voltage $v^*_{d\_dcpl}$ (or $v^*_{q\_dcpl}$), d-axis current detection value $i_d$ (or q-axis current detection value $i_q$), modulation factor $M_{fin}$, and synchronization pulse number num can be applied, and the carrier frequency can also be applied, as described above.

When any of the torque command value T*, d-axis current command value $i^*_d$ (or q-axis current command value $i^*_q$), non-interference voltage $v^*_{d\_dcpl}$ (or $v^*_{q\_dcpl}$), modulation factor $M_{fin}$, synchronization pulse number num, and carrier frequency have been applied as state quantities, they become the state quantities that correspond to the command values output by the controller. For example, if state quantities corresponding to detection values detected from the motor 17 are applied, a compensation value may be calculated using the state (detection values) one sampling before the software update cycle, and may be deviated from the appropriate compensation value. Since the detection values are generally fluctuating, an appropriate filtering is required, and when the torque or current is changing, the calculated compensation value may deviate from the appropriate compensation value because of the delay due to the filtering processing. However, by applying the state quantities corresponding to the command values output by the controller, the state quantities do not depend on the output, etc. of the motor 17, and the appropriate compensation value can be calculated without a delay due to the software update cycle.

Further, when any of the torque estimation value Test and d-axis current detection value $i_d$ (or q-axis current detection value $i_q$) are applied as state quantities, they become the state quantities that correspond to the detection values detected from the motor 17. For example, when the state quantities corresponding to the command values output by the controller are applied, because the command values differ from the detection values in the transient state where the command values change significantly, if the modulation mode is switched at this timing, the calculated compensation value may deviate from the appropriate compensation value. However, by applying the state quantities corresponding to the detection values detected from the motor 17, the appropriate compensation value can be calculated regardless of the presence or absence of a transient state.

While the embodiments of the present invention have been described above, the above-described embodiments only show part of application examples of the present invention and are not intended to limit the technical scope of the present invention to the specific configurations of the above-described embodiments.

The invention claimed is:

1. An electric motor control apparatus, wherein the electric motor control apparatus is configured to:
   alternately switch a modulation mode between an asynchronous pulse-width modulation (PWM) control, which controls an electric motor by fixing a PWM frequency, and a synchronous PWM control, which controls the electric motor by making the PWM frequency proportional to a drive frequency of the electric motor;
   immediately before switching the modulation mode, obtain a state quantity that correlates with a component in a rotating coordinate system of a voltage applied to the electric motor;
   when switching the modulation mode, calculate a compensation value based on the state quantity; and
   immediately after switching the modulation mode, compensate for the voltage by the compensation value,
   wherein the compensation value includes a voltage norm compensation value and a voltage phase compensation value.

2. The electric motor control apparatus according to claim 1, wherein:
   the state quantity is a command value for the electric motor to output a predetermined torque.

3. The electric motor control apparatus according to claim 1, wherein:

the state quantity is an estimation value of a torque output by the electric motor.

4. The electric motor control apparatus according to claim 1, wherein:
the state quantity is a command value for outputting a predetermined current to the electric motor.

5. The electric motor control apparatus according to claim 1, wherein:
the state quantity is a detection value of a current output to the electric motor.

6. An electric motor control method comprising:
alternately switching a modulation mode between an asynchronous pulse-width modulation (PWM) control, which controls an electric motor by fixing a PWM frequency, and a synchronous PWM control, which controls the electric motor by making the PWM frequency proportional to a drive frequency of the electric motor;
immediately before switching the modulation mode, obtaining a state quantity that correlates with a component in a rotating coordinate system of a voltage applied to the electric motor;
when switching the modulation mode, calculating a compensation value based on a state quantity; and
immediately after switching the modulation mode, compensating for the voltage by the compensation value,
wherein the compensation value includes a voltage norm compensation value and a voltage phase compensation value.

* * * * *